US012807466B2

(12) United States Patent
Guglielmo et al.

(10) Patent No.: US 12,807,466 B2
(45) Date of Patent: Nov. 24, 2026

(54) FORKLIFT KIT WITH INTERCHANGEABLE POWER SYSTEM CONVERSION UNITS

(71) Applicant: ETHIUM, LLC, San Antonio, TX (US)

(72) Inventors: Kennon Guglielmo, San Antonio, TX (US); Adam Schumann, San Antonio, TX (US); Brent Ludwig, San Antonio, TX (US); Matthew Martin, San Antonio, TX (US); Justin H. Sanders, San Antonio, TX (US); Ronald B. Roth, San Antonio, TX (US)

(73) Assignee: Ethium, LLC, San Antonio, TX (US)

( * ) Notice: Subject to any disclaimer, the term of this patent is extended or adjusted under 35 U.S.C. 154(b) by 246 days.

(21) Appl. No.: 18/703,876

(22) PCT Filed: Oct. 25, 2022

(86) PCT No.: PCT/US2022/078637
§ 371 (c)(1),
(2) Date: Apr. 23, 2024

(87) PCT Pub. No.: WO2023/076885
PCT Pub. Date: May 4, 2023

(65) Prior Publication Data

US 2024/0417228 A1 Dec. 19, 2024

Related U.S. Application Data

(60) Provisional application No. 63/271,942, filed on Oct. 26, 2021.

(51) Int. Cl.
*B66F 9/07* (2006.01)
*B60L 1/00* (2006.01)
(Continued)

(52) U.S. Cl.
CPC .......... *B66F 9/07572* (2013.01); *B60L 1/003* (2013.01); *B60L 50/60* (2019.02);
(Continued)

(58) Field of Classification Search
CPC .... B66F 9/07572; B66F 9/07531; B66F 9/22; B66F 9/24; B60L 1/003; B60L 50/60;
(Continued)

(56) References Cited

U.S. PATENT DOCUMENTS 3,278,785 A 10/1966 Hauth, Jr.
3,854,067 A 12/1974 Morgan
(Continued)

FOREIGN PATENT DOCUMENTS

CN 101662054 A 3/2010
CN 103625260 A 3/2014
(Continued)

OTHER PUBLICATIONS

Extended European Search Report dated Jul. 28, 2025; related EP Appl. No. 22888424.3.
(Continued)

*Primary Examiner* — Joseph J Dallo

(57) ABSTRACT

A kit for assembling a forklift capable of being either electrically-powered or powered by an internal-combustion source. The kit includes a forklift shell including a chassis and a hydraulic system. The kit further includes an internal-combustion (IC) powertrain including an IC engine, a transmission coupled to the IC engine, a drivetrain coupled with the transmission, and an IC hydraulics pump powered by the IC engine and configured to be coupled with the hydraulic system. The kit further includes an electric powertrain including a battery assembly, an electric motor powered by the battery assembly, a drivetrain coupled with the electric motor, and an electric hydraulics pump powered by the
(Continued)

battery assembly and configured to be coupled with the hydraulics system. Where one of the IC powertrain and the electric powertrain is configured to be coupled with the chassis and the hydraulics system for powering operation of the forklift.

20 Claims, 14 Drawing Sheets

(51) Int. Cl.
*B60L 50/60* (2019.01)
*B60L 58/18* (2019.01)
*B60L 58/26* (2019.01)
*B62D 65/02* (2006.01)
*B66F 9/075* (2006.01)
*B66F 9/22* (2006.01)

(52) U.S. Cl.
CPC ............... *B60L 58/18* (2019.02); *B60L 58/26* (2019.02); *B62D 65/02* (2013.01); *B66F 9/07531* (2013.01); *B66F 9/22* (2013.01); *B60L 2200/42* (2013.01)

(58) Field of Classification Search
CPC ...... B60L 58/18; B60L 58/26; B60L 2200/42; B62D 65/02
See application file for complete search history.

(56) References Cited

U.S. PATENT DOCUMENTS 3,885,204 A 5/1975 Abels et al.
3,886,426 A 5/1975 Daggett
3,997,888 A 12/1976 Kremer
4,086,524 A 4/1978 Kremer
4,186,333 A 1/1980 Kremer
4,244,040 A 1/1981 Fondiller et al.
4,329,615 A 5/1982 Tanaka et al.
4,337,408 A 6/1982 Sone et al.
4,461,958 A 7/1984 Krohling et al.
4,659,960 A 4/1987 Toya et al.
4,795,944 A 1/1989 Stimson
4,814,665 A 3/1989 Sakura et al.
5,021,494 A 6/1991 Toya
5,366,827 A 11/1994 Belanger et al.
5,550,424 A 8/1996 Jennrich et al.
6,038,877 A 3/2000 Peiffer et al.
6,060,821 A 5/2000 Suzuki et al.
6,125,030 A 9/2000 Mola
6,162,559 A 12/2000 Vutetakis et al.
6,276,161 B1 8/2001 Peiffer et al.
6,345,677 B1 2/2002 Eckersley et al.
6,361,897 B1 3/2002 Snyder
6,392,347 B2 5/2002 Arping et al.
6,399,238 B1 6/2002 Oweis et al.
6,455,988 B1 9/2002 Weber et al.
6,457,324 B2 10/2002 Zeigler et al.
6,482,541 B1 11/2002 Bator et al.
6,636,295 B2 10/2003 Shiozawa
6,637,807 B2 10/2003 Gotz
6,641,951 B1 11/2003 Vutetakis et al.
6,681,588 B2 1/2004 Zeigler
6,794,802 B2 9/2004 Pollner
6,841,293 B1 1/2005 Dreulle et al.
6,858,975 B1 2/2005 Matsutani
6,889,762 B2 5/2005 Zeigler et al.
6,965,514 B2 11/2005 Beihoff et al.
7,014,946 B2 3/2006 Partington et al.
7,023,174 B2 4/2006 Fromme et al.
7,128,179 B2 10/2006 Szymanski
7,163,088 B2 1/2007 Jahns et al.
7,175,379 B2 2/2007 Sellhorn et al.
7,258,184 B2 8/2007 Shorney et al.
7,304,453 B2 12/2007 Eaves
7,338,248 B2 3/2008 Buchmann et al.
7,448,227 B2 11/2008 Zeigler et al.
7,454,922 B2 11/2008 Zeigler et al.
7,548,429 B2 6/2009 Miller
7,553,583 B2 6/2009 Eaves
7,591,143 B2 9/2009 Zeigler et al.
7,591,303 B2 9/2009 Zeigler et al.
7,671,565 B2 3/2010 Straubel et al.
7,740,142 B2 6/2010 Miller et al.
7,872,449 B2 1/2011 Gutlen
7,876,913 B2 1/2011 Kobayashi et al.
D642,120 S 7/2011 Kretschmer
8,026,698 B2 9/2011 Scheucher
8,027,484 B2 9/2011 Yoshida et al.
8,036,396 B2 10/2011 Sakamoto et al.
8,113,311 B2 2/2012 Gerrmann et al.
8,141,377 B2 3/2012 Connell et al.
8,453,722 B2 6/2013 Zeigler et al.
8,464,679 B2 6/2013 Permuy et al.
8,517,087 B2 8/2013 Zeigler et al.
8,550,048 B2 10/2013 Stifel et al.
8,614,540 B2 12/2013 Braeuchle et al.
8,728,642 B2 5/2014 Maskew et al.
8,763,759 B2 7/2014 Viereck et al.
8,815,429 B2 8/2014 Hostler et al.
8,817,998 B2 8/2014 Inoue
8,839,753 B2 9/2014 Burrows et al.
8,942,836 B2 1/2015 Inoue et al.
8,963,481 B2 2/2015 Prosser et al.
8,978,801 B2 * 3/2015 Kumar .................. B60W 10/26 417/44.1
9,042,569 B2 5/2015 Sakamoto et al.
9,065,103 B2 6/2015 Straubel et al.
9,118,094 B2 8/2015 Tsujimura et al.
9,252,466 B2 2/2016 Norton
9,368,836 B2 6/2016 Coowar et al.
9,487,063 B2 11/2016 Zeigler et al.
9,694,651 B2 7/2017 Zeigler et al.
9,729,966 B2 8/2017 Pan
9,783,024 B2 10/2017 Connell et al.
9,796,239 B2 10/2017 Connell
9,840,130 B2 12/2017 Connell
9,874,384 B2 1/2018 Connell et al.
10,006,684 B2 6/2018 Connell et al.
10,081,226 B2 9/2018 Connell et al.
10,181,590 B2 1/2019 Zeiler et al.
10,205,363 B2 2/2019 Li et al.
10,218,239 B2 2/2019 Li et al.
10,245,916 B2 4/2019 Mayo Mayo et al.
10,263,488 B2 4/2019 Yang et al.
10,320,274 B2 6/2019 Yang et al.
10,367,239 B1 7/2019 Dao
10,369,863 B2 8/2019 Connell et al.
10,414,243 B2 9/2019 Connell et al.
10,665,893 B2 5/2020 Zang
10,703,173 B2 7/2020 Connell et al.
2001/0052968 A1 12/2001 Shiozawa
2003/0132041 A1 7/2003 Beihoff et al.
2004/0142238 A1 7/2004 Asahina et al.
2004/0149498 A1 8/2004 Nakashima
2004/0173408 A1 9/2004 Szymanski et al.
2005/0008465 A1 1/2005 Szymanski et al.
2005/0031936 A1 2/2005 Joos
2007/0009787 A1 1/2007 Straubel et al.
2007/0188130 A1 8/2007 Scheucher
2008/0011553 A1 1/2008 Mielke
2008/0179118 A1 7/2008 Hermann
2008/0213652 A1 9/2008 Scheucher
2008/0241667 A1 10/2008 Kohn
2008/0268330 A1 10/2008 Hansen
2009/0134718 A1 5/2009 Hurst et al.
2011/0001352 A1 1/2011 Tamusa
2012/0068540 A1 3/2012 Luo
2012/0243130 A1 9/2012 Gaben
2012/0244398 A1 9/2012 Youngs
2012/0248868 A1 10/2012 Mobin et al.
2012/0299531 A1 11/2012 Prosser et al.
2013/0164155 A1 6/2013 Ozawa et al.

(56) References Cited

U.S. PATENT DOCUMENTS

| | | | |
|---|---|---|---|
| 2013/0171480 A1 | 7/2013 | Englert et al. | |
| 2013/0236745 A1 | 9/2013 | Norton | |
| 2013/0248262 A1* | 9/2013 | Kumar | B60L 50/16 180/65.245 |
| 2013/0270016 A1 | 10/2013 | Donnell et al. | |
| 2014/0079977 A1 | 3/2014 | Tsujimura | |
| 2015/0093653 A1 | 4/2015 | Coowar et al. | |
| 2015/0318521 A1 | 11/2015 | Zeiler et al. | |
| 2015/0375698 A1 | 12/2015 | Joao | |
| 2016/0164063 A1 | 6/2016 | Angerbauer | |
| 2016/0336623 A1 | 11/2016 | Nayar et al. | |
| 2016/0347161 A1 | 12/2016 | Kusumi et al. | |
| 2017/0125861 A1 | 5/2017 | Machida | |
| 2017/0331302 A1 | 11/2017 | Namiki | |
| 2018/0026456 A1 | 1/2018 | Kang | |
| 2018/0108890 A1 | 4/2018 | Fees et al. | |
| 2018/0241074 A1 | 8/2018 | Zhang et al. | |
| 2019/0058336 A1 | 2/2019 | Thompson | |
| 2019/0103639 A1 | 4/2019 | Guglielmo et al. | |
| 2019/0193622 A1 | 6/2019 | Moon | |
| 2019/0300348 A1 | 10/2019 | Wild et al. | |
| 2021/0261208 A1 | 8/2021 | Claesson et al. | |
| 2022/0352560 A1 | 11/2022 | Guglielmo et al. | |
| 2022/0355832 A1* | 11/2022 | Bachman | B61D 15/00 |
| 2022/0416312 A1 | 12/2022 | Zeiler | |
| 2024/0417228 A1* | 12/2024 | Guglielmo | B66F 9/07572 |

FOREIGN PATENT DOCUMENTS

| | | | |
|---|---|---|---|
| CN | 106129457 | A | 11/2016 |
| CN | 112550462 | A | 3/2021 |
| DE | 102005053305 | A1 | 5/2007 |
| DE | 102012106885 | A1 | 1/2014 |
| DE | 102012107700 | A1 | 1/2014 |
| DE | 102012107604 | A1 | 2/2014 |
| DE | 102012107670 | A1 | 2/2014 |
| DE | 102013113809 | A1 | 6/2015 |
| DE | 102013114894 | A1 | 7/2015 |
| DE | 102014106795 | A1 | 11/2015 |
| EP | 0620604 | A2 | 10/1994 |
| EP | 0662725 | B1 | 9/2000 |
| EP | 1079982 | B1 | 3/2004 |
| EP | 1961596 | A3 | 12/2009 |
| EP | 1985481 | B1 | 12/2010 |
| EP | 2261167 | A1 | 12/2010 |
| EP | 1515304 | B1 | 4/2012 |
| EP | 1961599 | B1 | 7/2013 |
| EP | 2650251 | A1 | 10/2013 |
| EP | 2700611 | A1 | 2/2014 |
| EP | 3065959 | A1 | 9/2016 |
| EP | 2008354 | B1 | 10/2016 |
| EP | 2945215 | B1 | 8/2017 |
| EP | 3217134 | A1 | 9/2017 |
| EP | 3193105 | A3 | 12/2017 |
| EP | 3287718 | A1 | 2/2018 |
| EP | 3301379 | A1 | 4/2018 |
| EP | 3323187 | A1 | 5/2018 |
| EP | 3323188 | A1 | 5/2018 |
| EP | 3323189 | A1 | 5/2018 |
| EP | 3323190 | A1 | 5/2018 |
| EP | 2969613 | B1 | 8/2018 |
| EP | 3125332 | B1 | 9/2018 |
| EP | 3386786 | A1 | 10/2018 |
| EP | 3507115 | A1 | 7/2019 |
| EP | 2944493 | B1 | 12/2019 |
| EP | 2889930 | B1 | 9/2020 |
| EP | 2969615 | B1 | 6/2021 |
| GB | 2086323 | A | 5/1982 |
| JP | 2011-508366 | A | 3/2011 |
| JP | 2014-96236 | A | 5/2014 |
| JP | 2014-108052 | A | 6/2014 |
| JP | 2014-187730 | A | 10/2014 |
| JP | 2015-214167 | A | 12/2015 |
| KR | 10-2008-0060585 | | 7/2008 |
| KR | 10-2021-0111371 | A | 9/2021 |
| WO | 2006124663 | A2 | 11/2006 |
| WO | 2007095327 | A2 | 8/2007 |
| WO | 2014143899 | A1 | 9/2014 |
| WO | 2017004078 | A1 | 1/2017 |
| WO | 2017106104 | A1 | 6/2017 |
| WO | 2019014653 | A1 | 1/2019 |

OTHER PUBLICATIONS

U.S. Appl. No. 18/030,599, Non-Final Office Action issued Nov. 18, 2025.

* cited by examiner

FORKLIFT KIT WITH INTERCHANGEABLE POWER SYSTEM CONVERSION UNITS

CROSS-REFERENCE TO RELATED APPLICATIONS

This application claims the benefit of the filing date of U.S. Provisional Application Ser. No. 63/271,942, filed on Oct. 26, 2021, entitled "Interchangeable Forklift Power System Conversion Units for OEM Implementation", as well as the entire disclosure of which is hereby incorporated by reference into the present disclosure.

BACKGROUND OF THE INVENTION

1. Field of the Invention

The present invention relates to gas-powered and electric-powered industrial forklifts, the methods by which such forklifts are produced, and the systems by which those forklifts are powered. More particularly, the invention is most directly related to power system implementations for Class I and Class IV forklift fleets, wherein the chassis for gas-powered forklifts are typically different than the chassis for electric-powered forklifts, although the present invention may also find applicability in relation to other types of industrial trucks that are powered by similar systems as well.

2. Description of Related Art

In the late 1800s, the first ancestor of today's industrial truck was simply a two-wheel hand truck that allowed the hoisting of heavy loads without the input of manual lifting. Railway companies quickly adapted these into four-wheel baggage wagons that were capable of carrying heavier loads, though they lacked any hoisting mechanisms. The first powered platform truck was introduced in 1906 when the Pennsylvania Railroad integrated storage battery power into their baggage wagons. Controls at the front of the machine allowed for the wagon to self-propel. In 1909, the first all-steel lift trucks appeared in paper factories. These trucks featured a pulley system capable of lifting heavy loads vertically by a few inches. During World War I, the need to make up for labor shortages incentivized the development of new lift trucks. The first of these evolutionary models consisted of an electric-powered crane capable of lifting and lowering loads, and this was quickly adapted into a powered platform-lift truck. Around 1919, high lift trucks equipped with forks and rams allowed for a greater range of operation and the handling of different types of loads, including the commonly used wooden-pallet skids. Further development of lift trucks saw the introduction of hydraulic-powered lift systems, and in the early 1920s, new lift trucks were capable of lifting loads higher than the height of the truck.

Leading into World War II, as warehouses saw the increasing use of forklifts, more innovations were made. Rechargeable batteries allowed for the continuous use of forklifts. The introduction of the center-controlled truck, the model most similar to modern rider fork trucks, allowed for the lifting and carrying of heavier loads because the battery, acting as the counterweight, was positioned further away from the fulcrum. Mechanisms on the mast of the forklift allowed for the tilting of the forks. Operator cages and backrests on the forks addressed safety concerns. Additionally, internal-combustion engines were used to make forklifts more powerful and more capable of outdoor use.

Modern improvements to forklifts include the use of lighter, stronger materials in forklift construction, better balancing technology to compensate for top-heavy forklifts, and smarter computer systems such as operator presence-detection systems. Industrial fork trucks today with internal-combustion engines are typically powered by diesel fuel, propane gas, or gasoline. Electric fork trucks are typically powered by lead-acid batteries.

In the field of the present invention, manufacturers typically use independent designs for different classes of forklifts; one chassis model for Class I battery powered forklifts, and a completely different chassis model for Class IV internal combustion (IC) powered forklift trucks. The size and weight of the battery or internal-combustion engine typically dictates much of the design for the differing chassis, which then dictates the entire design of the forklift. The manufacturing process is therefore more complicated and requires many different parts and tools to construct the two different types of forklifts and their respective chassis.

Battery powered forklifts are typically Class I forklifts powered by lead-acid batteries that can weigh more than a thousand pounds. This makes the battery powered forklift much heavier than the internal-combustion forklift, and therefore more power is needed to operate the electric forklift effectively. Heavier loads will cause the charge of the battery to be drained more rapidly. The lead-acid batteries also become a major part of the counterweight but are located in a less than optimal location—at the center of the truck as opposed to at the rear-end. This can effectively limit the lifting capacity of the electric forklift as compared to that of an otherwise comparable internal-combustion forklift.

Gas powered forklifts, on the other hand, are typically Class IV forklifts with chassis that are often more affordable to produce and don't require daily electric recharge. They are also often thought of as having more reliable power with better acceleration and increased lift speed. Preferred embodiments of the present invention involve gas-powered forklifts. It should be understood by those skilled in the art that references to "gas-powered" forklifts within the scope of the present application refers to forklifts powered by gaseous hydrocarbons, whether propane, butane, natural gas, or other gaseous hydrocarbons. Still other alternative embodiments within the realm of internal combustion powered forklifts fueled by other forms of gaseous fuel, such as, perhaps, hydrogen, are also likely to be within the scope of some aspects of the present invention.

Forklifts powered by a battery-powered power source, whether that be a lead-acid battery or lithium-ion batteries, incorporate a chassis specifically designed to accommodate the battery power source. Similarly, forklifts powered by internal combustion engines incorporate a chassis specifically designed to accommodate the internal combustion engine. However, there is not currently a forklift that incorporates a chassis that can be paired with either a battery power source or an internal combustion engine. Needless to say, as a result of the fundamental differences in design, gas-powered forklift chassis are very different from the chassis for electric powered forklifts. Accordingly, forklift manufacturing is hindered since different chassis and other associated parts are required depending on whether the forklift is to be powered by a battery or an internal-combustion engine.

SUMMARY OF THE INVENTION

The innovations described in the present disclosure enable the use of the same chassis design for both internal-combustion and battery powered forklifts, and, hence, improve the manufacturing process and associated costs for forklifts. This objective is accomplished, in part, by making it so that the original equipment manufacturer can use a single forklift chassis for both gas-powered and electric battery powered forklifts. The present disclosure illustrates and describes electric battery power system assemblies adapted to be interchangeable with gas power system assemblies, so both types of power systems can be mounted in the same chassis. The electric battery powered module preferably uses lithium-ion batteries, and the lithium-ion battery pack of the battery power system that can be implemented in the present disclosure will stay within the forklift for the life of the vehicle, as opposed to traditional lead-acid battery packs that often need to be replaced. The battery pack itself contains rechargeable and interchangeable modules. The battery power system fits into the same chassis within the forklift as a system powered by an internal combustion engine. This not only enables the benefits of lithium-ion battery power, but also creates an option for interchangeability; the original equipment manufacturer can now make one truck with one sized frame, and then they or an end user can choose whether to implement an internal-combustion engine or the battery power system.

The lithium-ion battery pack of the battery power system that are implemented with the present disclosure is much lighter than traditional lead-acid battery packs, about half the weight in some embodiments, while still attaining sufficient counterbalance, and will allow the resulting forklift to operate on an equivalent-energy basis with better lifting capacity and battery life. Further, in some embodiments, forklifts implemented with the electric system of the disclosed embodiments will be 25% lighter than a traditional internal-combustion forklift. The difference in weight between the battery power system as presently disclosed and the traditional internal-combustion engine will not affect the counterbalance required to prevent tipping while the forklift is lifting and maneuvering with a load. Internal-combustion forklifts typically have designated counterweights positioned at the rear of the forklift, and similar counterweights can be implemented with the embodiments of the present disclosure to compensate for the lighter weight of the battery power system.

The disclosed forklift kit provides a user with greater range of performance than just an electric forklift or IC-powered forklift can alone. For example, in some embodiments, the electric powertrain presently disclosed can outperform internal-combustion forklift powertrains, especially in acceleration and steep grade ratability. In some embodiments, the lithium-ion battery pack of the disclosed battery power system is capable of providing 150% more power (including torque conversion) than traditional internal-combustion forklifts. However, in other embodiments, an IC-powered forklift may be preferred for any of a number of reasons, such as for range, reliability, and ease of refueling reasons.

Whereas many traditional forklifts typically use constant speed motors for powering the hydraulics system and the traction system, the present disclosure allows for variable speed motors to be used. Specifically, by adjusting the current flowing to the electric system of the integrated engine, the resulting independent variable speed motor can control the speed of the hydraulic system. More importantly, in part by using the variable speed motor, embodiments are enabled to preserve and extend the battery's charge, driving the hydraulic pump at a slower speed when operating conditions do not require faster speeds. To enable as much, the electric power system is able to detect when power steering is needed or not, such as when the forklift is in forward or reverse, or neutral. If forward or reverse are engaged, the power system will engage a delay-factor to keep the power steering on for a short duration after use and then reduce the hydraulic pump speed and, hence, power steering in order to prolong use between recharges. Thus, the variable speed motor of the hydraulic system can be used efficiently such that the speed of the motor can be controlled to meet the current hydraulic demand.

Disclosed, according to various embodiments of this disclosure, is a kit for assembling a forklift capable of being either electrically-powered or powered by an internal-combustion source. The kit includes a forklift shell including a chassis and a hydraulic system. The kit further includes an IC powertrain including an IC engine, a transmission coupled to the IC engine, a drivetrain coupled with the transmission, and an IC hydraulics pump powered by the IC engine and configured to be coupled with the hydraulic system. The kit further includes an electric powertrain including a battery assembly, an electric motor powered by the battery assembly, a drivetrain coupled with the electric motor, and an electric hydraulics pump powered by the battery assembly and configured to be coupled with the hydraulics system. Where one of the IC powertrain and the electric powertrain is configured to be coupled with the chassis and the hydraulics system for powering operation of the forklift.

BRIEF DESCRIPTIONS OF THE DRAWINGS

Figure 8:
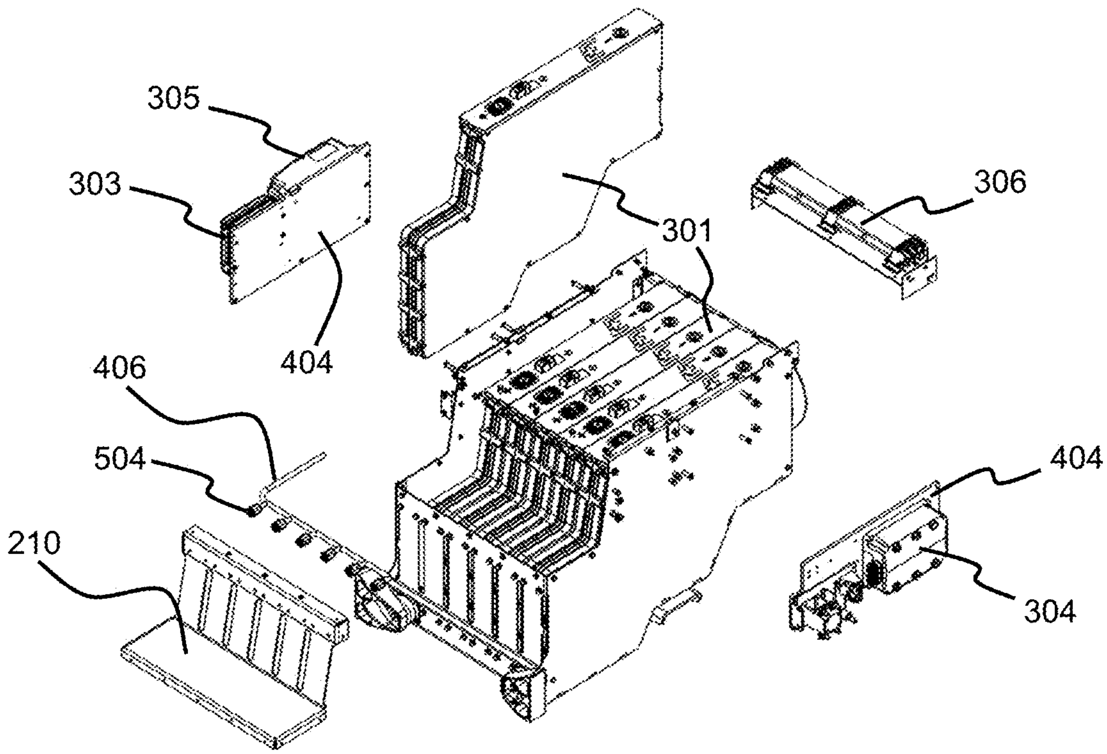

FIG. 8 illustrates an exploded front perspective view the modular battery power and control system assembly with one battery module removed and five battery modules inserted into the battery assembly. Side components show the electric motor controls for both the traction motor and hydraulic motor. Rear component shows the high current bus assembly.

Figure 9:
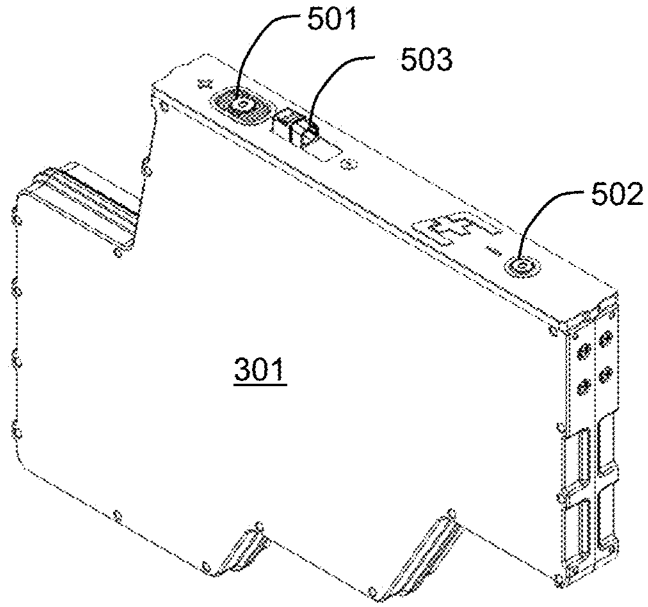

FIG. 9 illustrates a rear perspective view of a battery module of the modular battery power and control system assembly.

Figure 10:
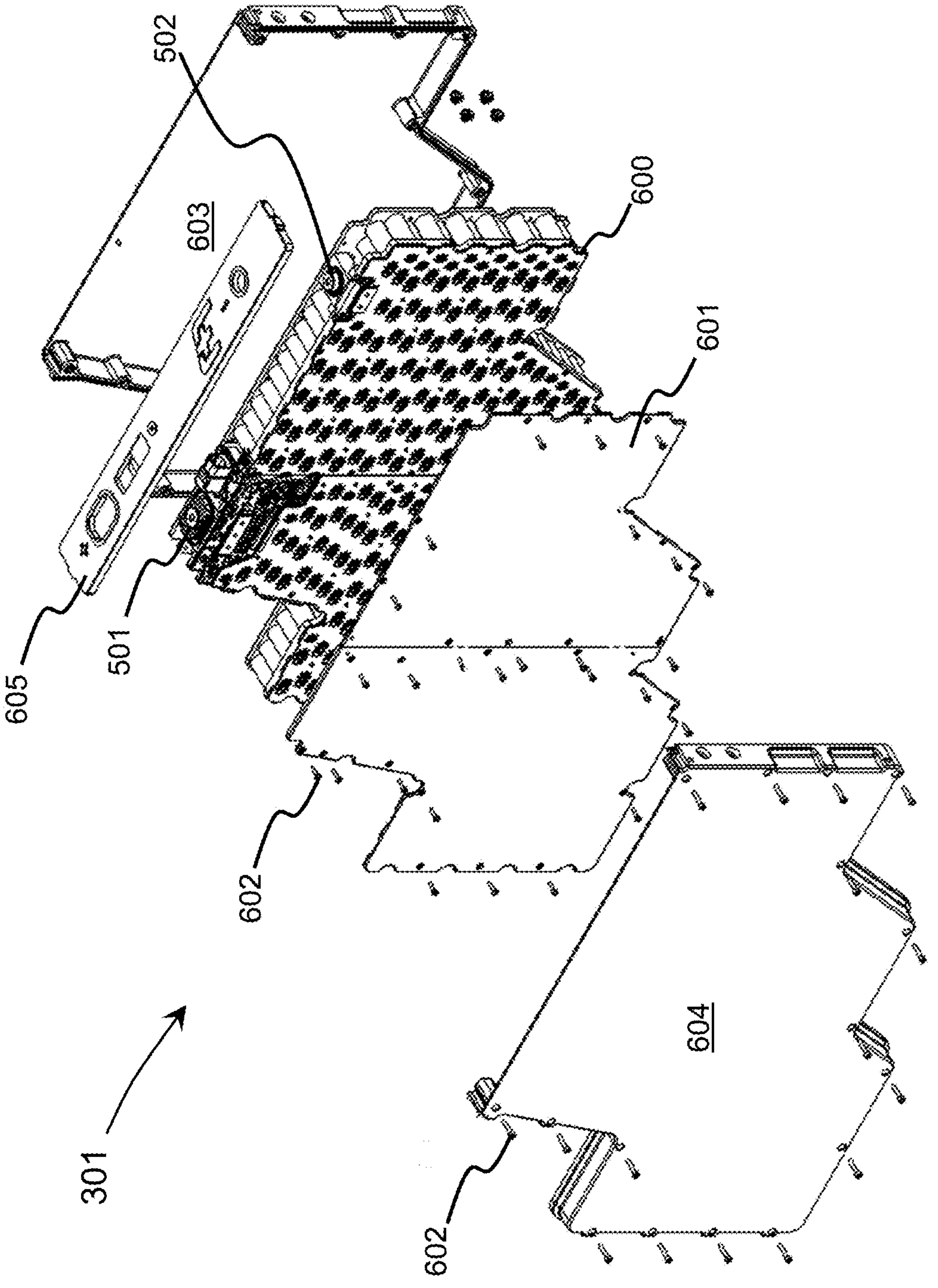

FIG. 10 illustrates an exploded rear perspective view of the battery module of FIG. 9.

Figure 11:
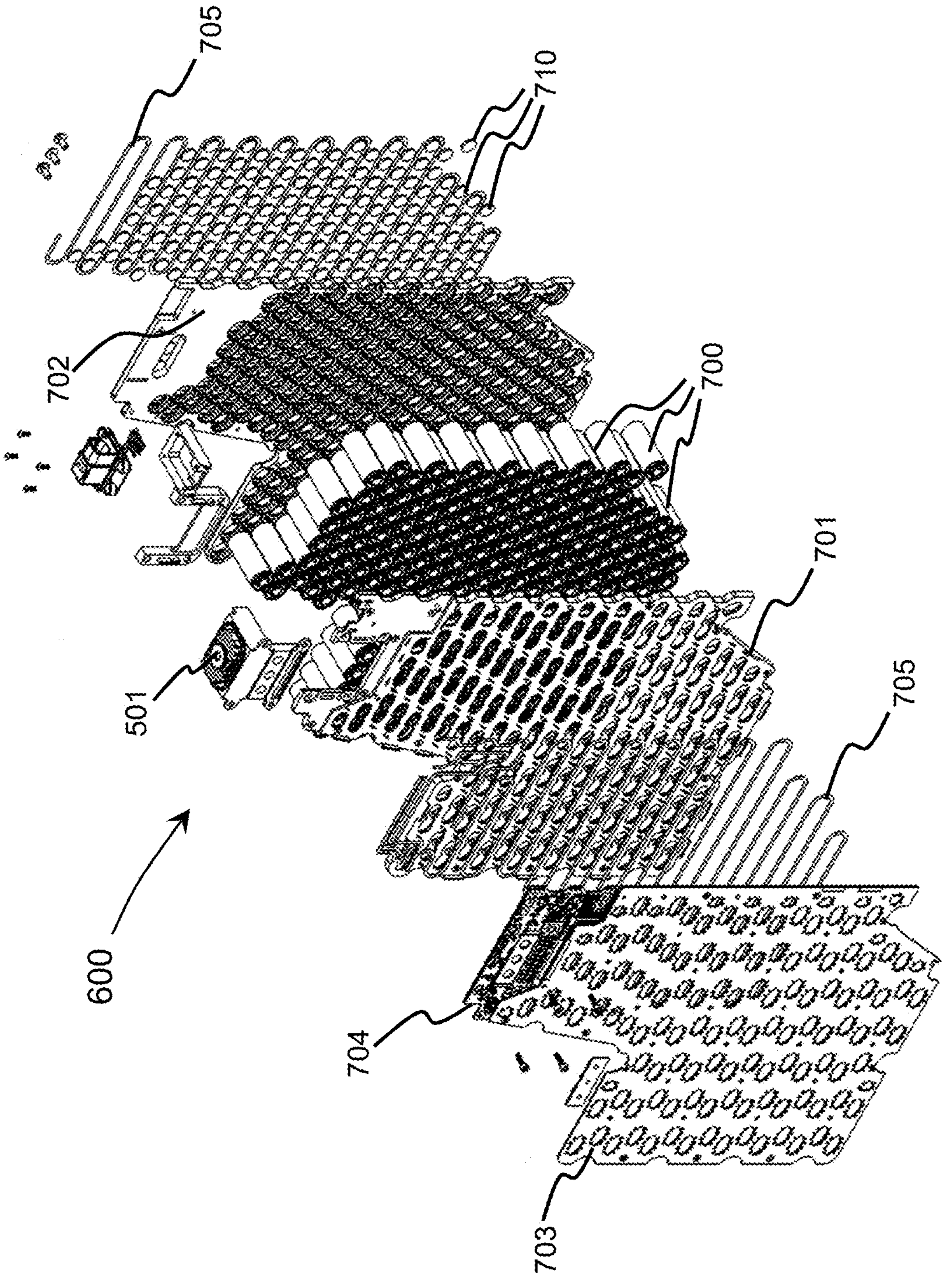

FIG. 11 illustrates an exploded perspective view of a front portion of an internal cell array of the battery module of FIG. 10.

Figure 12:
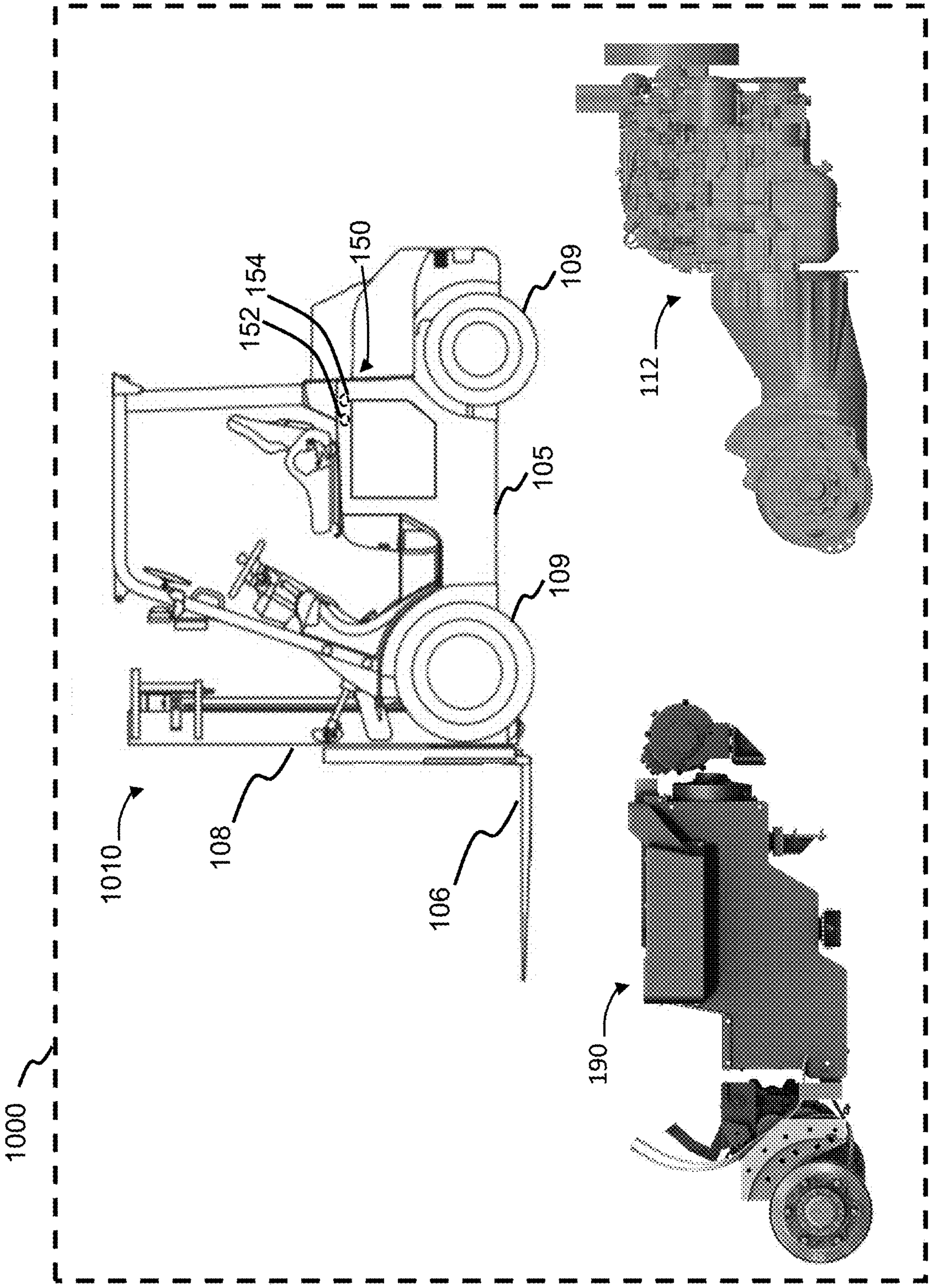

FIG. 12 illustrates a forklift kit assembly with interchangeable powertrains, according to an embodiment of this disclosure.

Figure 13:
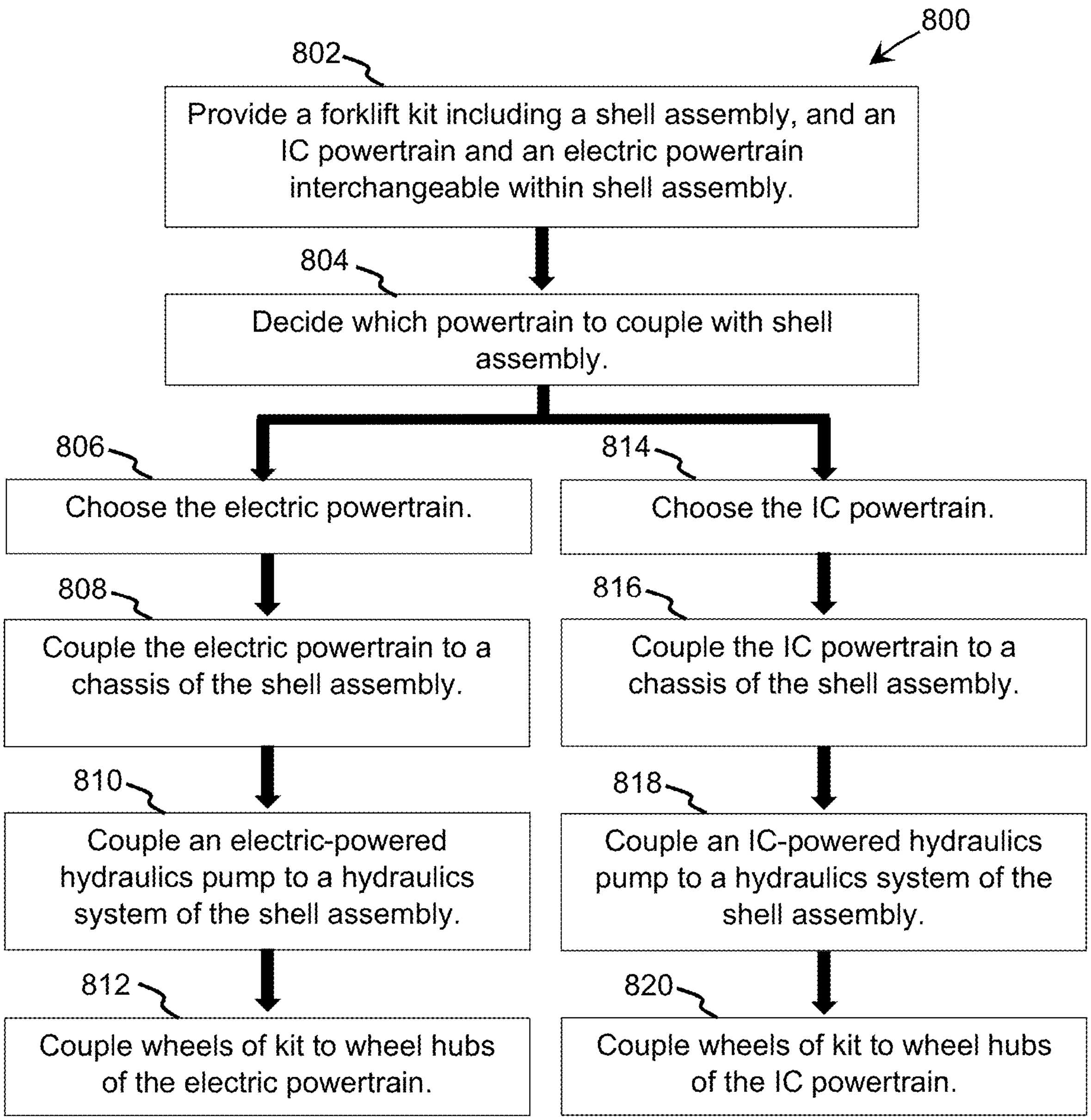

FIG. 13 is a flowchart illustrating a method of using the forklift kit for assembling a gas-powered or electric-powered forklift, according to an embodiment of this disclosure.

DETAILED DESCRIPTIONS OF THE INVENTION

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

PREFERRED EMBODIMENTS

The following descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should also appreciate that many changes can be made relative to the disclosed embodiments while still obtaining a comparable function or result without departing from the spirit and scope of the invention.

Forklifts

Figure 1:
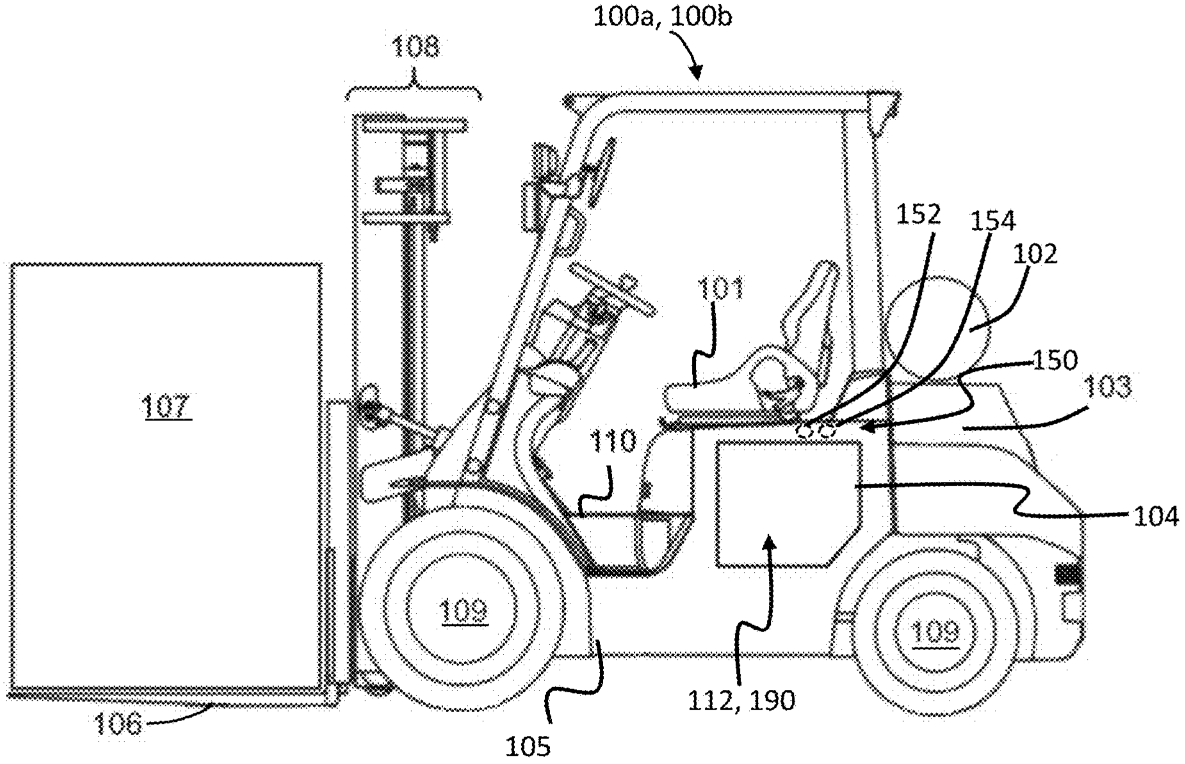
FIG. 1 illustrates a side view of forklifts according to embodiments of this disclosure.

FIG. 1 illustrates a side view of a forklift 100*a* powered by an internal combustion (IC)-powered powertrain 112 and a forklift 100*b* powered by a battery-powered powertrain 190 according to various embodiments of this disclosure.

As will be discussed in greater detail, forklift 100*a*, 100*b* includes a hydraulic system 150 that works in conjunction with the power sources 112, 190 to control the primary functions of the forklift 100*a*, 100*b*. Several types of pumps can be used to pressurize a line in a hydraulic circuit. Depending on the amount of pressure and which line is pressurized, the result is a change of flow direction in the hydraulic circuit; this change in flow determines the directions of functions such as lifting and steering. Forklift 100*a*, 100*b* is a mobile truck with a lifting assembly 108 for raising and lowering forks or other load supporting members 106 that are adapted to support a load 107 thereon, for the purpose of lifting, carrying, or moving that load 107.

In some embodiments forklift 100*a*, includes a fuel tank 102 and a counterweight 103. Beneath the seat assembly 101 and footwell 110 is a power source compartment 104 of the chassis 105 that contains either of the internal combustion-powered powertrain 112 (IC powertrain) or the battery-powered power source 190 (electric powertrain). Forklift 100*a* is powered by internal combustion-powered power source 112 and forklift 100*b* is powered by battery-powered power source 190 while sharing may common components, as will continued to be discussed in greater detail below.

As previously discussed, forklifts 100*a*, 100*b* include a hydraulics system 150 for controlling lifting assembly 108 and a power steering system of forklift 100*a*, 100*b*. As discussed in greater detail below, belt-driven hydraulic pump 122 of powertrain 112 is operatively coupled the hydraulics system 150 for charging system 150. Powertrain 112 is mounted in compartment 104 of chassis 105 to at least one power source mounting member. In some embodiments, powertrain 112 is mounted to a plurality of mounting members. As will be discussed in greater detail below, electric powertrain 190 can be mounted in compartment 104 by being mounted to one, some, or all of the mounting members used to mount IC powertrain 112. In some embodiments, chassis 105 is made of carbon steel or another alloy with similar properties. Forklifts 100*a*, 100*b* also include wheels 109, at least some of which are coupled to and powered by powertrain 112, 190.

Hydraulic system 150 is for powering operation of lifting assembly 108 and for power steering of the forklift 100*a*, 100*b*. Those with skill in the art will understand that hydraulic system 150 comprises the various components of traditional forklift hydraulic systems, such as, for example, a hydraulic fluid reservoir, an accumulator, relief valves, and hydraulic cylinders. Hydraulic system 150 further includes hydraulic supply port 152 and hydraulic return port 154 connectable to supply and return lines of a hydraulic pump for charging the hydraulic system 150. Specifically, as will be discussed in greater detail below, ports 152, 154 are connectable with IC-powered hydraulic pump 122 or electric-powered pump 199 for hydraulically charging the system 150.

Figure 2A:
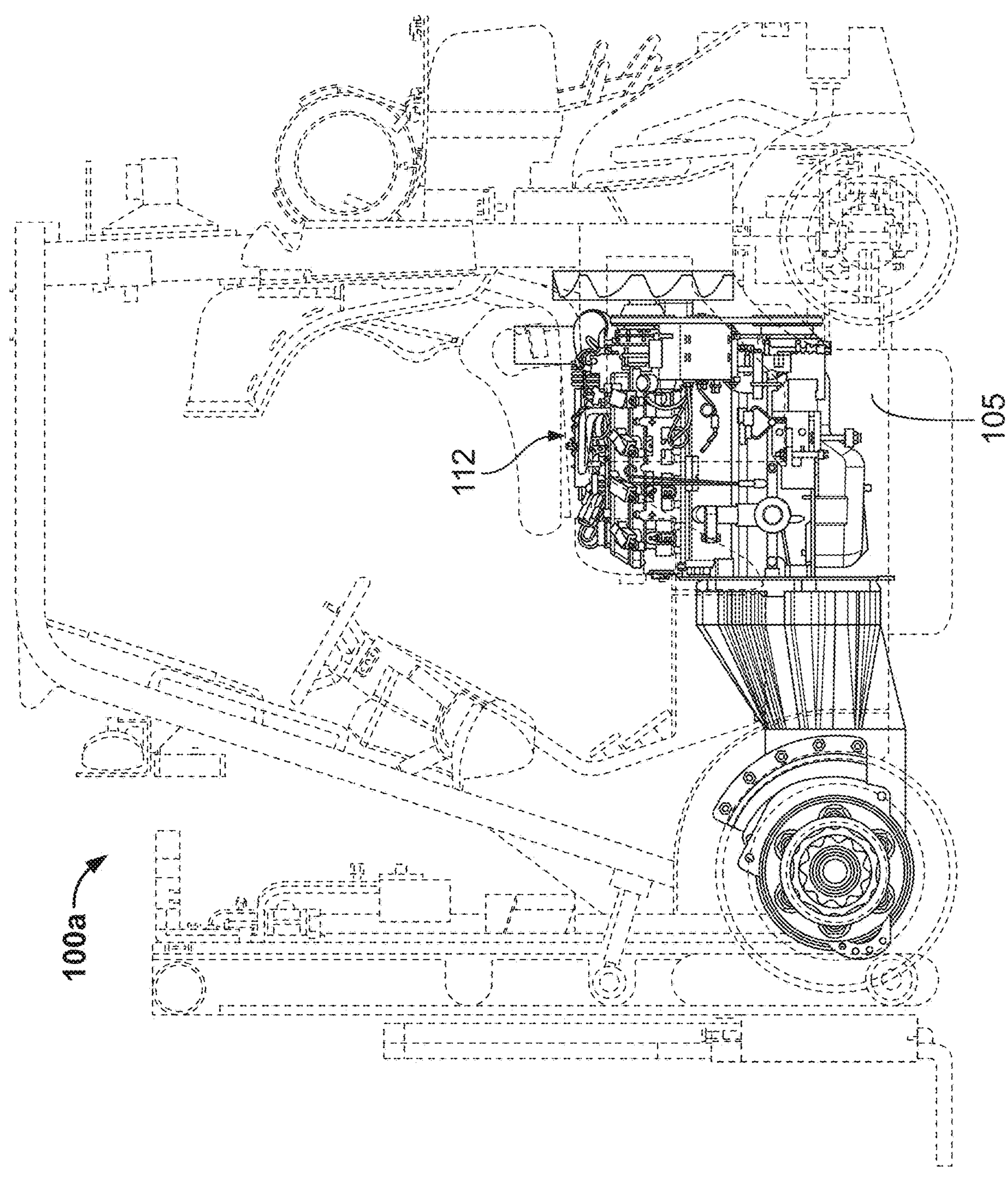
FIGS. 2A and 2B illustrate side and top views, respectively, of a partially-transparent forklift to show an internal-combustion-powered powertrain, according to an embodiment of this disclosure.
Figure 2B:
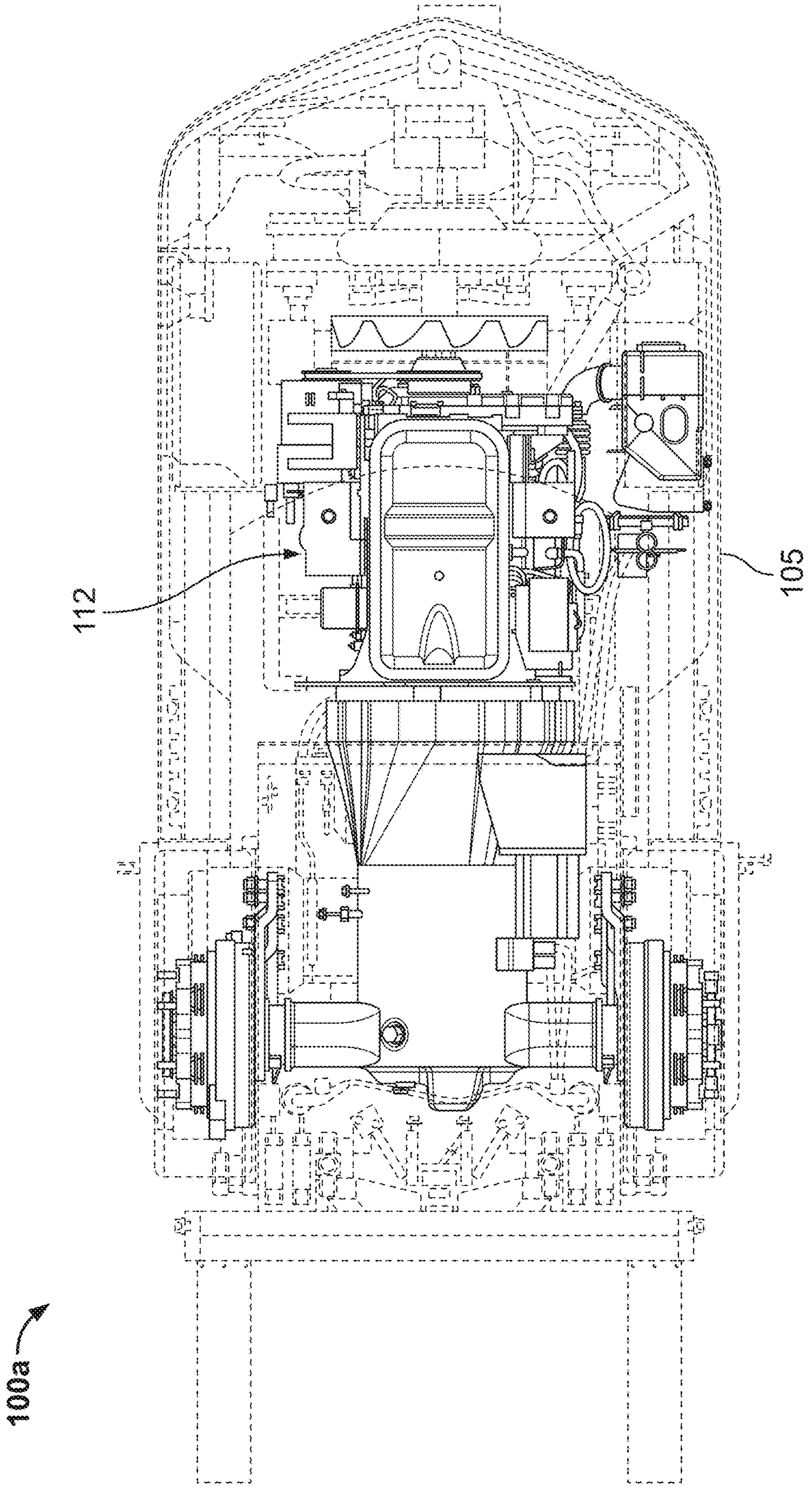
Figure 3A:
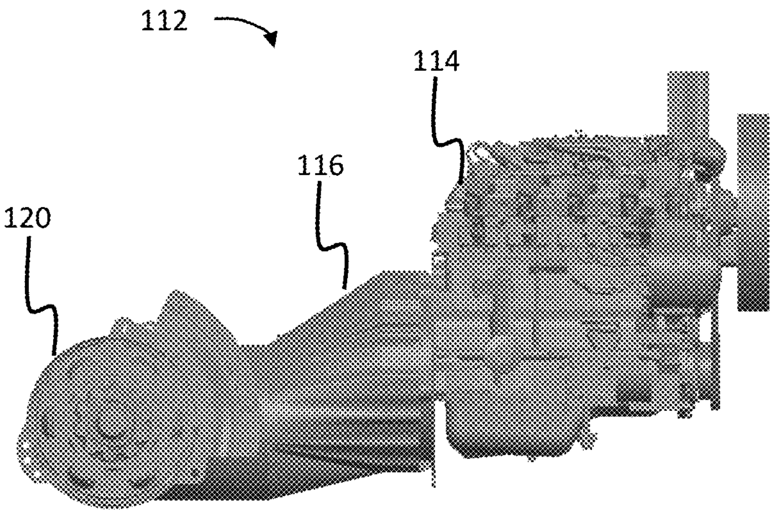
FIGS. 3A and 3B illustrate side and top views, respectively, of an internal-combustion-powered powertrain, according to an embodiment of this disclosure.
Figure 3B:
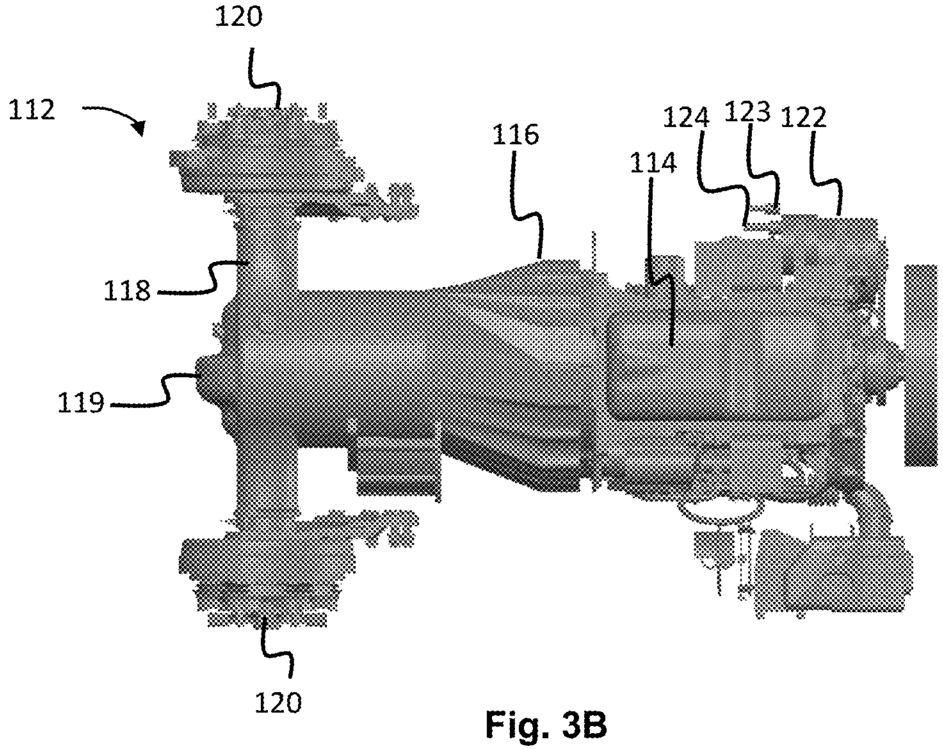

FIGS. 2A and 2B illustrate partially transparent top a side views, respectively, of IC powered forklift 100*a* to show IC powertrain 112. FIGS. 3A and 3B illustrate top and side views, respectively, of IC powertrain 112. As previously discussed, forklift 100*a* differs from forklift 100*b* in the powertrains incorporated, but remain the same in essentially every other aspect. IC powertrain 112 is mounted to chassis 105. IC powertrain includes an IC engine 114 operatively coupled with a transmission 116. Transmission 116 is operatively coupled with a front axel 118 by a differential 119 and is coupled with hubs 120 upon which wheels 109 are mounted. Thus, those with skill in the art will understand that, through the operative coupling described, engine 114 is configured to deliver power to front wheels 109 for operation. Additionally, engine 114 is configured to drive hydraulic pump 122 through a belt-drive operative connection. Pump 122 is coupled to a hydraulic system 150 that is used to control the power steering system and the operation of lifting assembly 108. Specifically pump supply port 123 is configured to be coupled with and deliver pressurized hydraulic fluid to system supply port 152 to charge system, and pump return port 124 is configured to be coupled with system return port 154 to complete the closed-loop hydraulic system 150 at pump 122.

Figure 4A:
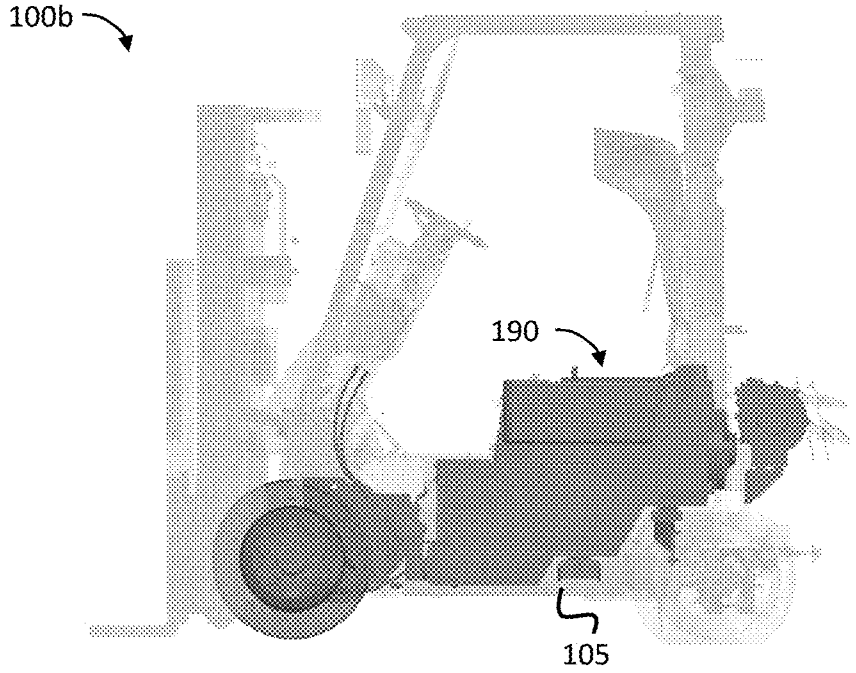
FIGS. 4A and 4B illustrate side and top views, respectively, of a partially-transparent forklift to show an electric-powered powertrain, according to an embodiment of this disclosure.
Figure 4B:
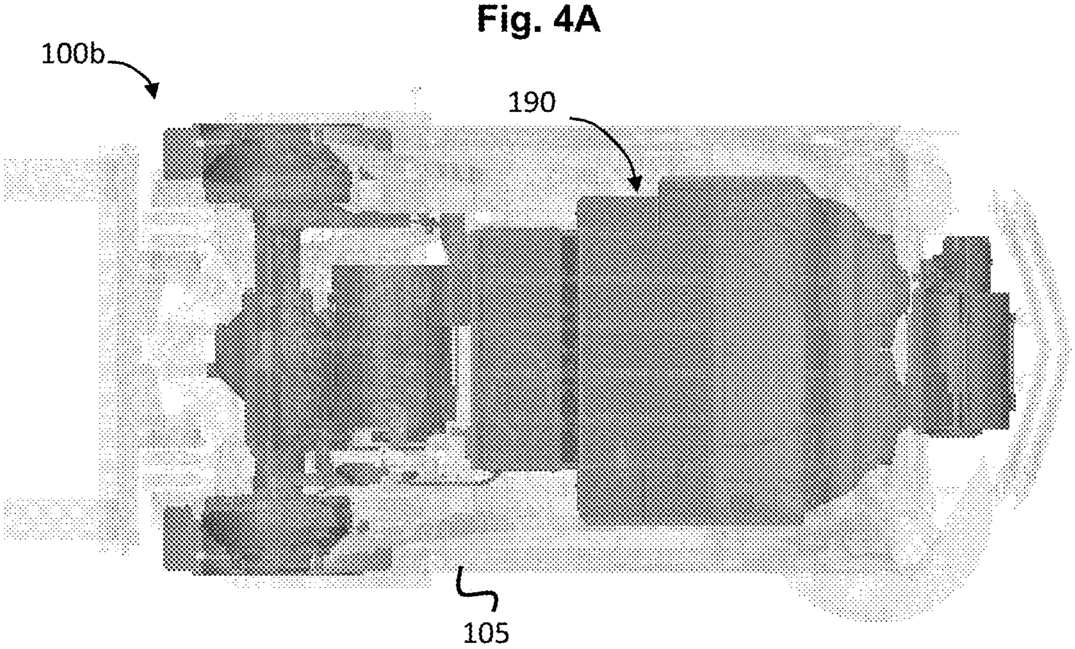
Figure 5A:
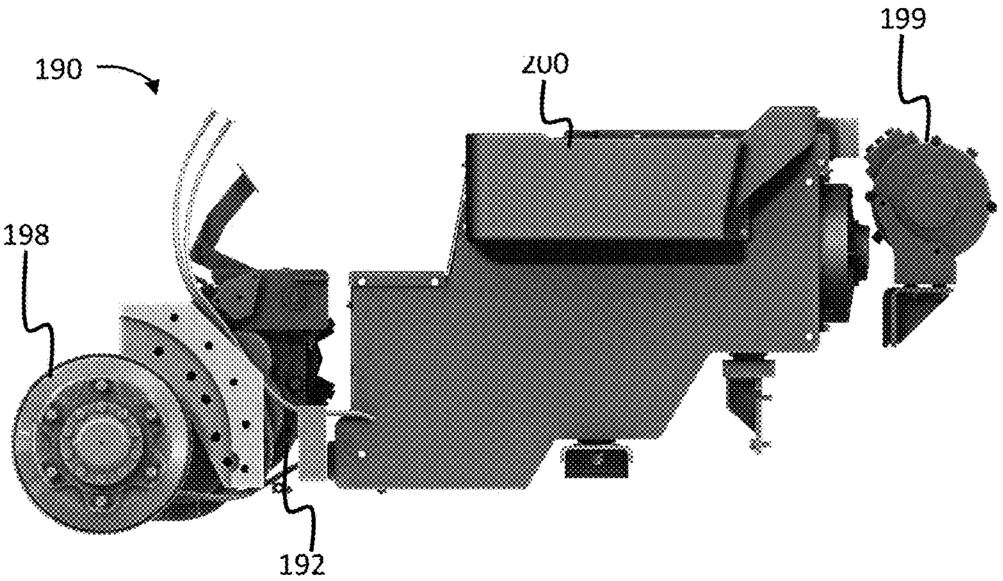
FIGS. 5A and 5B illustrate side and top views, respectively, of an electric-powered powertrain, according to an embodiment of this disclosure.
Figure 5B:
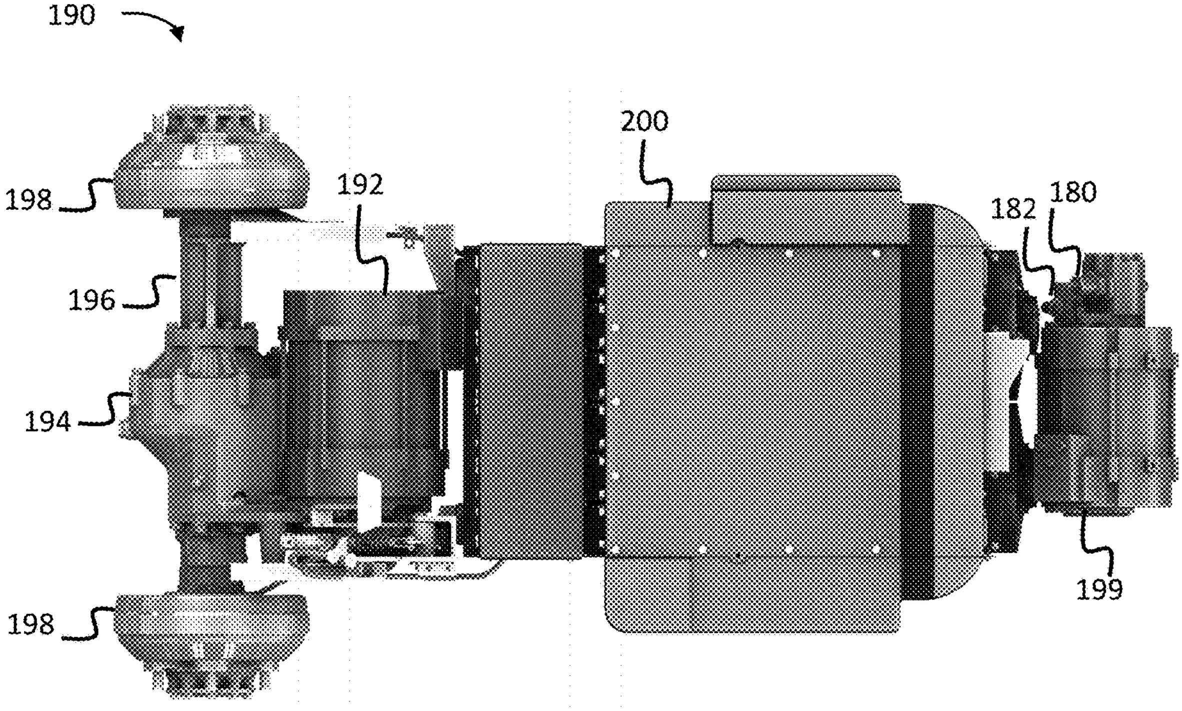

FIGS. 4A and 4B illustrate partially transparent top a side views, respectively, of electric-powered forklift 100*b* to show electric powertrain 190. FIGS. 5A and 5B illustrate top and side views, respectively, of electric powertrain 190. As previously discussed, forklift 100*a* differs from forklift 100*b* in the powertrains incorporated, but remain the same in essentially every other aspect. Electric powertrain 190 includes a battery assembly 200 which powers an electric traction motor 192. Motor 192 is coupled with axel 196 which is coupled to hubs 198 upon which wheels 109 are mounted. In some embodiments, powertrain further includes a differential 194 which is used to operatively couple motor 192 to axel 196. Battery assembly 200 is also electrically coupled with an electric hydraulic pump 199 used to charge the hydraulic system 150 for operating the power steering system and lifting assembly 108. Those with skill in the art will understand that pump 199 includes an electric motor to drive the pump, and pump electric motor is powered by connection to battery assembly 200 and controlled by a pump motor controller of the battery assembly, as will be discussed in greater detail below. Pump supply port 180 is configured to be coupled with and deliver pressurized hydraulic fluid to system supply line 152 to charge system, and pump return port 182 is configured to be coupled with system return line 154 to complete the closed-loop hydraulic system at pump 122.

In some embodiments hubs 198 are the same as hubs 120 to allow for the same wheel 109 to be interchangeably used with either hub 120 or hub 198. Additionally, in some embodiments, axel 118 and differential 119 are the same as axel 196 and differential 194 such that either electric motor 192 or transmission 116 can be coupled with the same differential 119, 194. However, in other embodiments, axel 118 and differential 119 are different that axel 196 and differential 194.

Battery Assembly

Figure 6A:
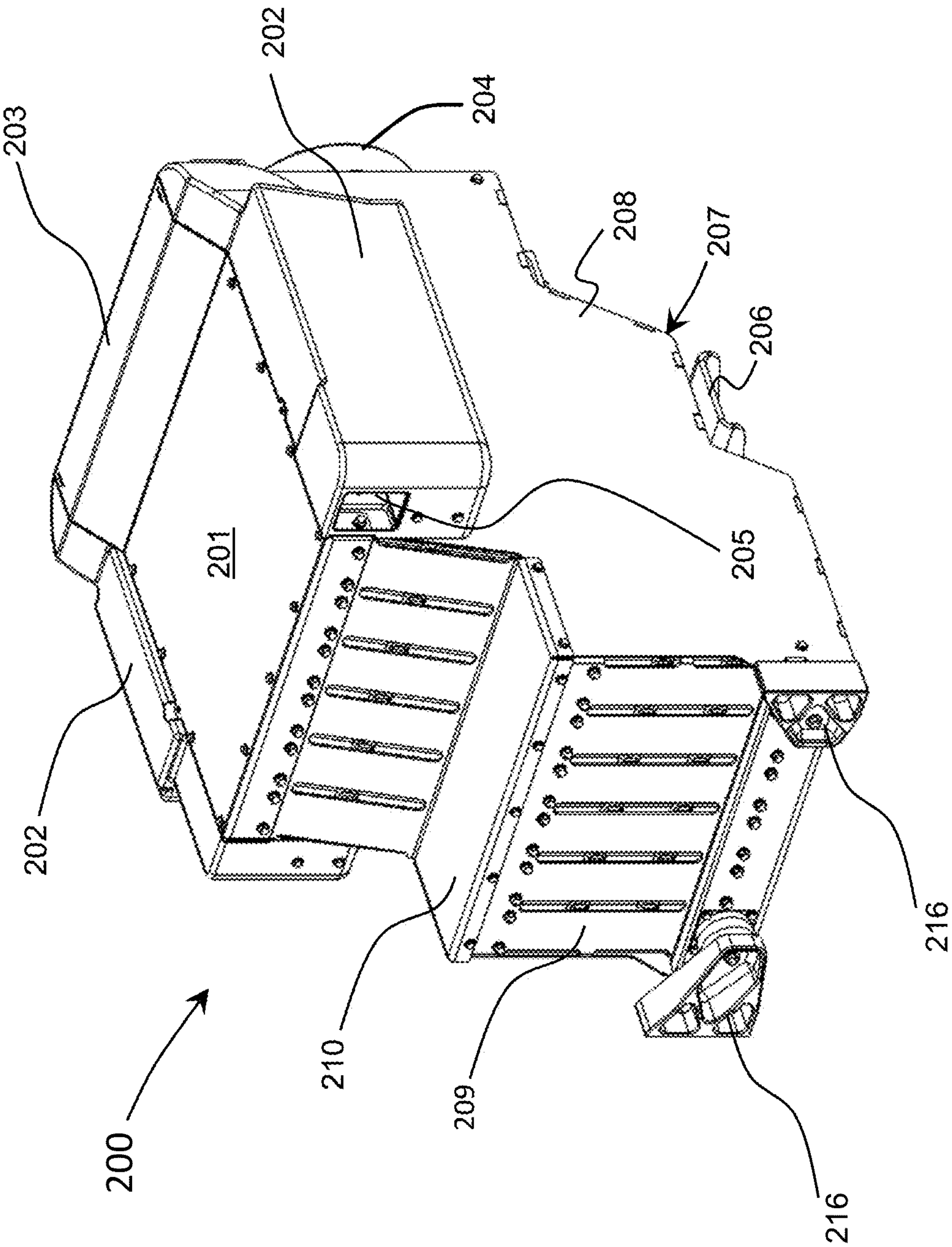
FIG. 6A and FIG. 6B, illustrate front and rear perspective views, respectively, of a preferred embodiment of a modular battery power and control system assembly with housing covers over the modules and cables, according to an embodiment of this disclosure.
Figure 6B:
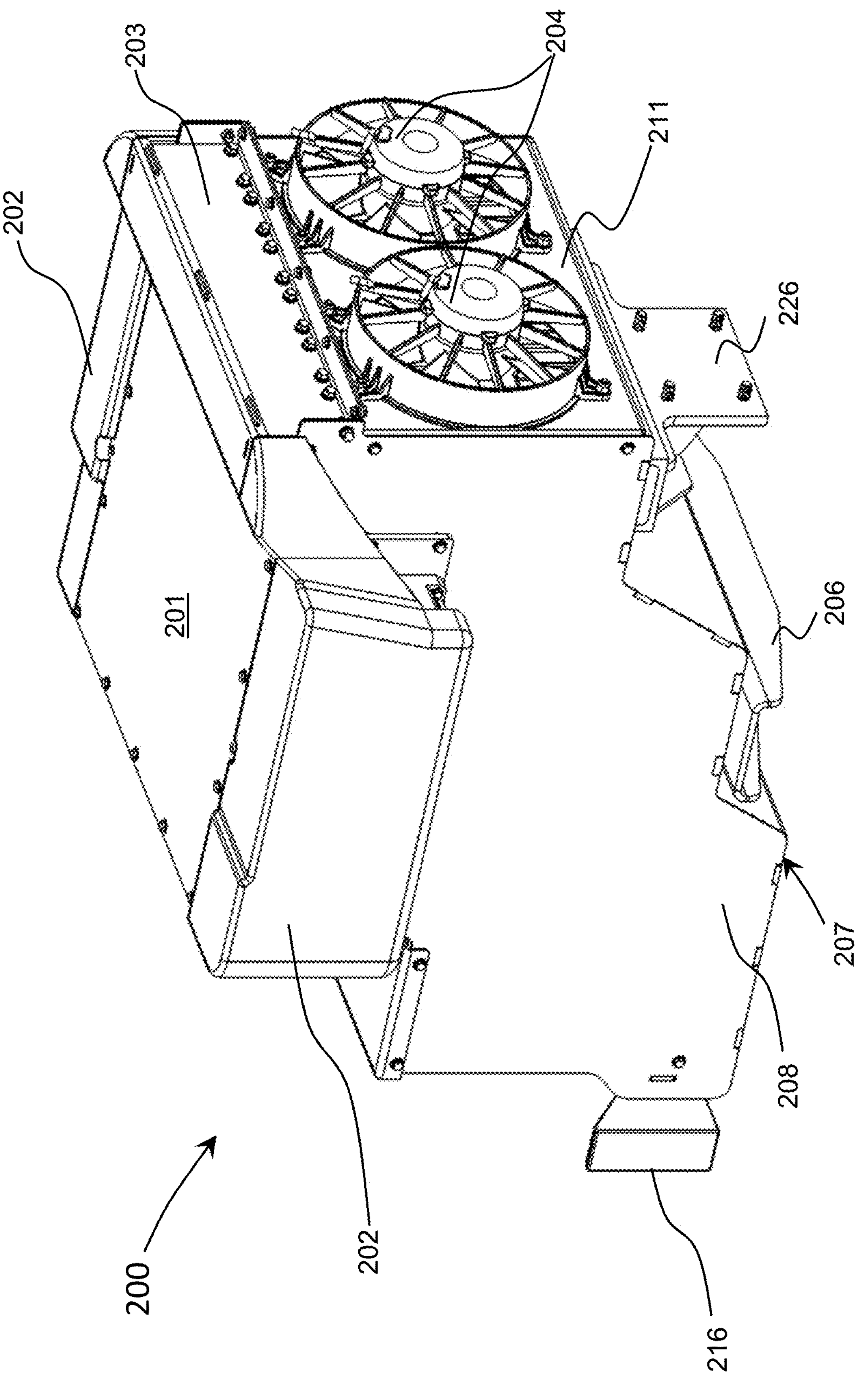
Figure 7:
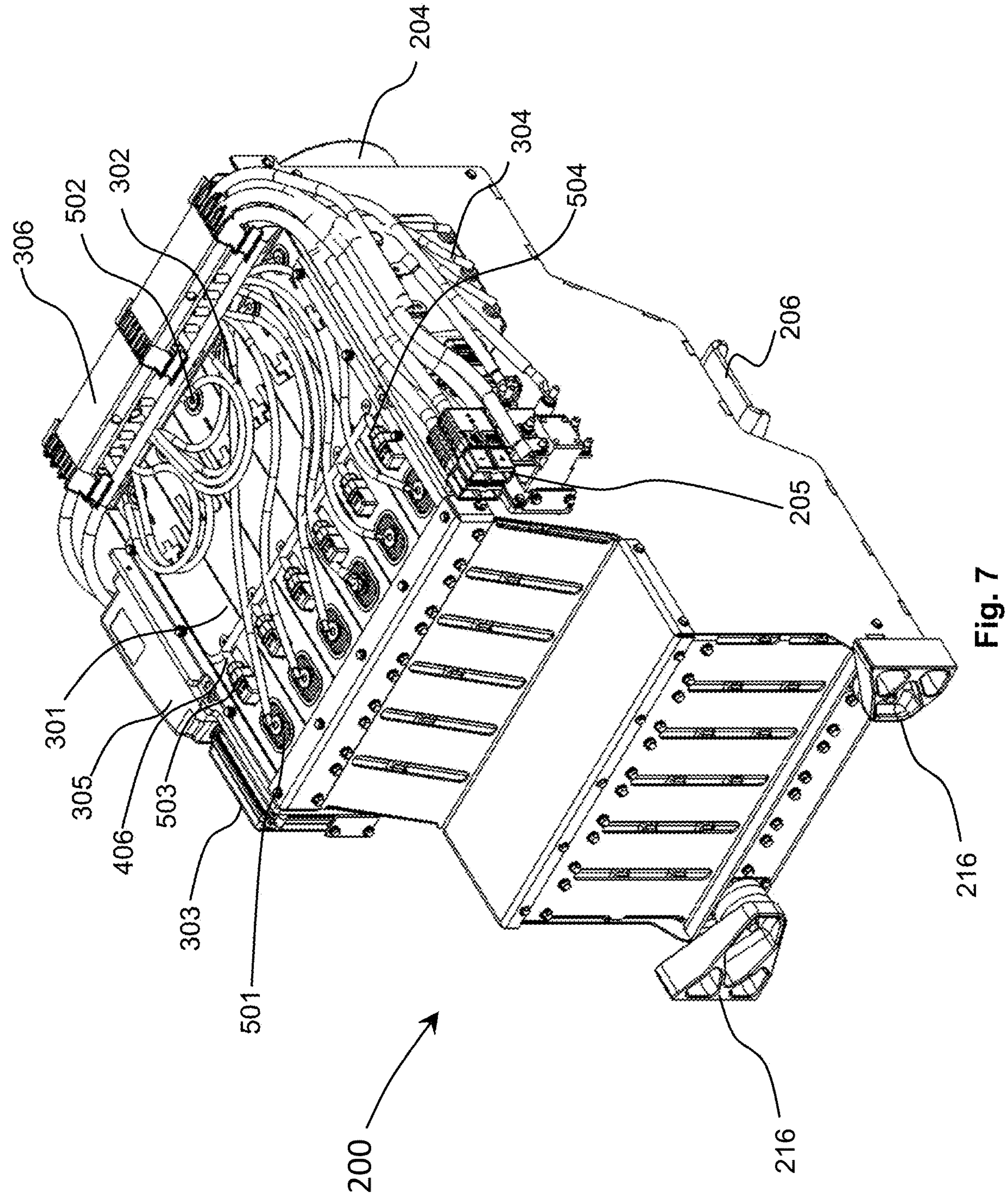
FIG. 7 illustrates a front perspective view of the modular battery power and control system assembly with housing covers removed to show the battery modules and cables.

Referring to FIGS. 6A, 6B, and 7, there are shown front and rear perspective views of a preferred embodiment of a modular battery assembly 200. Assembly 200 has housing covers 201, 202, and 203 covering battery modules 301, cables 302, and electric motor controls. Top housing cover 201 houses battery modules 301 and connecting cables 302. Side housing covers 202 house an electric motor controller 305 for traction motor 192, a hydraulic controller 304 for hydraulic motor 199, and charging ports 205. Rear cover 203 houses a high current bus assembly 306. Fans 204 are configured to cool modules 301 and are disposed below rear cover 203. Covers 201-203 are attached to a housing frame 207. Housing frame 207 includes two side panels 208, a front panel 209, a footwell panel 210, and a rear panel 211. In some embodiments, footwell panel 210 partially defines footwell 110. That is to say, an outer facing side of footwell panel 210 is disposed in footwell 110 and is positioned to protect internal components of assembly 200 from the feet of an operator of forklift 100*b*. Each side panel 208 is fastened to the front panel 209 and rear panel 211 using bolts or other similar fastening methods. In some embodiments, each panel 208-211 is constructed of a metal, such as steel or some other alloy with similar strength and structural properties. As illustrated, in some embodiments, assembly 200 comprises two fans 204 for colling the battery modules, which will be discussed in greater detail below. However, one with skill in the art will recognize that in some embodiments, assembly 200 comprises fewer or more than two fans 204.

Electric powertrain 190 with battery assembly 200 is sized and adapted to be able to safely fit in the same chassis 105 as IC powertrain 112. Typically, internal combustion engine 114 is mounted with a minimum of three points of connection. In accordance with the aforementioned interchangeability of the present disclosure, mounting points of the assembly 200 to the chassis 105 are similar or the same as those of IC powertrain 112. Assembly 200 comprises a bottom mounting plate 206 disposed on a bottom side of assembly 200. Bottom mounting plate 206 is mounted to chassis 105 to connect assembly 200 to chassis 105. In some embodiments, fasteners are used to connect bottom mounting plate 206 to chassis 105. In some embodiments, a welding or other adhesive process is used to connect bottom plate 206 to chassis 105. In some embodiments, bottom mounting plate 206 is connected to chassis 105 via a method of press-fitting. Assembly 200 comprises a rear mounting plate 226 disposed at a rear side of assembly 200. Rear mounting plate 226 is mounted to chassis 105 to connect assembly 200 to chassis 105. As illustrated, in some embodiments, fasteners are used to connect mounting plate 226 to chassis 105. In some embodiments, a welding or other adhesive process is used to connect rear mounting plate 226 to chassis 105. In some embodiments, mounting plate 226 is connected to chassis 105 via a method of press-fitting. Assembly 200 comprises mounting brackets 216 disposed at a front side of assembly 200. Mounting brackets 216 are configured to connect to corresponding bracket receptacles of chassis 105. However, those with skill in the art will recognize that brackets 216 can be connected to chassis 105 by any of a number of connection methods, such as the connection methods described for connecting mounting plates 206, 226 to chassis 105. These points of connection allow assembly 200 to spatially replace internal-combustion-powered power source 112. Mounting plates 206, 226 and mounting brackets 216 can be welded or bolted to the assembly 200; however other similar joining methods may be also considered by those of skill in the art. Hence, for use in forklift 100 shown in FIG. 1, powertrain 190 and battery assembly 200 is adapted to fit in a MCFA model FCG25N forklift chassis for use as a replacement of a conventional IC powertrain 112. Battery assembly 200 is mounted into compartment 104 by being mounted to a mounting member of chassis 105 also utilized by IC powertrain 112. In some embodiments, mounting plate 206 and/or mounting plate 226 is mounted to a mounting member that power source 112 is mounted in forklift 100*a*. In some embodiments, the mounting receptacles of chassis 105 are configured to connect with mounting brackets 216 and corresponding mounting brackets of power source 112. Accordingly, either engine 116 or battery assembly 200 is configured for installment in power source compartment 104. The shape of the assembly 200 has a customized profile that compensates for the footwell 110 of the forklift 100 where the operator's feet rest.

As has been described, powertrain 190 and powertrain 112 are interchangeable sources to create either IC forklift 100*a* or electric forklift 100*b*. Hydraulic motor controller 304 is configured to electrically control the hydraulics pump 199 associated motor that provides fluid pressure to manipulate the lift and tilt of lifting assembly 108 and the power steering system. Thus, hydraulic motor controller 304 is operatively coupled to the hydraulics pump motor 199 to charge the hydraulics system 150. In some embodiments, the hydraulics motor 199 can be mounted behind assembly 200 in an opening of a counterweight of forklift 100*b*. Unlike IC powertrain 112, powertrain 190 does not incorporate a separate transmission to control speed or power delivered to forklift's drive train. Instead, in some embodiments, the traction motor 192 is a variable speed motor configured to provide variable speed and power to the axel 196. Similarly, in some embodiments, the hydraulic pump 199 associated motor is also a variable speed motor, and can thus control the hydraulics pump used to pressurize the forklift's hydraulic system at variable pressures depending on the hydraulic demand of the system. Assembly 200 is configured to work in conjunction with the various systems and controls of forklift 100*b* that are also configured to be operatively coupled with IC powertrain 112 and specifically IC engine 114.

Those with skill in the art will understand that the dimensions, fit, shape, and weight for different makes and models of forklifts will dictate a range of dimensions for alternate embodiments that are intended to be used with any particular make and model of forklift. The full range of sizes for Class IV forklift chassis are intended for alternative embodiments.

Turning to FIG. 7, there is shown a front perspective view of a preferred embodiment of the battery assembly 200 with housing covers 201-203 removed. FIG. 8 shows an exploded view of the battery assembly 200 shown in FIG. 7. Preferred embodiments have six battery modules 301 arranged vertically. That is to say, battery modules 301 are arranged such that a height of each battery module 301 is substantially parallel with a vertical axis of forklift 100*b*. Battery modules 301 are disposed within assembly 200 along an axis substantially perpendicular to the vertical axis of forklift 100*b* and substantially perpendicular to a length axis of forklift 100*b* extending from a front side to a rear side of forklift 100*b*. That is to say, the axis along which battery modules 301 are disposed is substantially parallel to a width axis of forklift 100*b*. Alternative embodiments may have different quantities of battery modules 301. Additionally, alternate embodiments can have battery modules 301 arranged along an axis different than what has been described, such as, for example, an axis parallel to the vertical axis of forklift 100 or an axis parallel to the length axis of forklift 100*b*.

Charging ports 205 and electric motor controllers 305, 304 are affixed to motor controller cooling plates 404 that are bolted to side panels 208. Controller cooling plates 404 are comprised of a thermally conductive material to provide thermal inertia for heat generated by controllers 304, 305 and to reject the heat to the ambient atmosphere. In some embodiments, cooling plates 404 are comprised of aluminum. Charging ports 205 use several battery cables 302 for connection. A cable 302 is used to connect charging ports 205 to a high current bus assembly 306. Other cables 302 are used to connect charging ports 205 to a positive bus terminal 501 and a negative bus terminal 502 (shown in FIG. 9) located on the top of each battery module 301. High current bus assembly 306 is affixed at the rear of the assembly 200, above fans 204.

A Battery Operating System Supervisor (BOSS) module processor ("BOSS module") 303 serves as a battery management system for the battery modules 301 and is also affixed to one of the plates 404. BOSS Module 303 uses a pin connection 503 on each battery module 301 to monitor each said battery module 301. The term "pin" is used to describe the wires that correspond to their respective pin insert 504 in wire harness 406. The number of pins in each pin insert 504 is dependent upon the number of diagnostic signals retrieved and controlled by the BOSS module 303. For examples of the functionality of the BOSS module 303 and high current bus assembly 306, see International Patent Publication Number WO 2019/014653 A1, which is incorporated by reference in its entirety into the present disclosure.

Access to the battery modules 301 for maintenance can be accomplished by the removal of footwell panel 210 or high current bus assembly 306. Additionally, if removal of any battery module 301 is desired, then it is necessary to detach all battery cables from the positive and negative bus terminals 501, 502 as well as the pin connector 503 on said modules 301.

In some embodiments, the electric motor controllers 304, 305 are designed by the original equipment manufacturer, while in other embodiments third party manufacture electric motor controllers 304, 305. Controller 304 electrically controls pump 199 that provides fluid pressure in order to manipulate the lift and tilt of the mast as well as the power steering. The controller 305 controls traction electric motor 192.

Battery Module and Electrical Design of Battery Cell Network

FIG. 9 illustrates a perspective rear view of a battery module 301. The positive and negative bus terminals 501, 502 are located on the top of each module 301 along with the female pin connector 503.

FIG. 10 illustrates an exploded view of a battery module 301. A battery cell array 600 is affixed to a tray 601 by a series of screws 602 and is then enclosed by a male enclosure plate 603 and a female enclosure plate 604 which are held together by screws 602. A plastic cover 605 affixes to the top of the battery module 301, with plastic cover 605 having openings for access to positive terminal 501, negative terminal 502, and pin connector 503.

FIG. 11 illustrates an exploded internal view of a front portion of battery cell array 600, as well as the top level of the battery module 301. Each battery module 301 has a printed circuit board 703 that incorporates a battery management system 704. Lithium-ion battery cells 700 are enclosed by top and bottom battery cell trays (701 and 702, respectively). Each battery cell tray 701, 702 defines openings above and below each battery cell 700. Below bottom battery cell tray 702 is a tray adhesive 705 that adheres cell tray 702 to enclosure plate 603, and thermal gap filling material 710 that transfers heat between battery cells 700 and cover 603. The thermal gap filling material 710 is preferably thermally conductive and electrically insulative. Thermal gap filling material 710 is part of a thermal management system (along with fans 204) by helping to draw away heat from the battery cells 700 and to transfer that heat, preferably to the bottom enclosure plate 603.

Each of the battery cells 700 are interconnected through wire bonding to a printed circuit board (PCB) 703. By the wire bonding to PCB 703, the battery cells 700 provide electric potential between the terminals 501, 502. The PCB 703 has the battery management system (BMS) 704 that is made by the original equipment manufacturer. An adhesive, which is an electrical insulator, or another type of adhesive, is used between the top battery cell tray 701 and the PCB 703, as well as between cell array 600 and the bottom battery cell tray 702. Tray adhesive 705 adheres cell tray 701 to PCB 703. Although not illustrated, in some embodiments, gap filling material 710 is disposed between PCB 703 and cell tray 701 to transfer heat between PCB 703 and lithium-ion battery cells 700.

Preferred embodiments of battery module 301 contain 496 lithium iron phosphate (LFP) battery cells 700. Alternative embodiments may utilize a different lithium-ion chemistry for the battery cells 700. The battery cells 700 are divided into groups of cells called "banks". The BMS 704 in each module 301 can monitor the voltage, temperature, and state of charge for the banks but cannot monitor individual battery cells 700. BMS 704 is further capable of activating or deactivating the battery module 301 through the use of field-effect transistors. Alternate embodiments of battery modules 301 may contain variations of the arrangement or numbers of battery cells 700.

Forklift Kit Assembly Kit with Interchangeable Powertrains

FIG. 12 illustrates a forklift kit 1000 used for assembling forklifts 100*a*, 100*b*, according to an embodiment of this disclosure. Kit 1000 includes IC powertrain 112, electric powertrain 190, and forklift shell 1010. Forklift shell 1010 includes various components of that commonly utilized in both IC forklift 100*a* and electric forklift 100*b* that have been previously described. For example, shell 1010 includes chassis 105, four wheels 109, lifting device 108 with lift platforms 106, and hydraulic system 150 with pump supply and return ports 152, 154. Those with skill in the art will understand that, according to various embodiments of the disclosure, the shell 1010 and powertrain 190, 112 of kit 1000 are stored together in any of various container, such as a box, a shipping container, or a storage container, for example. However, in other embodiments, kit 1000 does not include a container.

As will be discussed in greater detail below, kit 1000 is used for convenient assembly of either IC forklift 100*a* or electric forklift 100*b*. Those with skill in the art will understand the many benefits associated with kit 1000 provided. For example, one benefit comes in improved efficiency in engineering and manufacturing of the forklift. Traditionally, the powertrains of electric forklifts and IC forklifts differ greatly from each other in size and geometry such that providing common components for use in either IC or electric forklifts, such as chasses or hydraulic systems for example, has been unachievable. Unlike traditional designs, electric powertrain 190 and IC powertrain 112 are designed to be intertangle within shell 1010. Such interchangeability allows for many common parts that can be used with either powertrain 112, 190 and thus eliminates the previous need to engineer separate components depending on the type of powertrain being used. The benefits are further seen in manufacturing efforts, as common part numbers can be used between forklifts 100*a* and 100*b*, thus adding efficiency to supply of common parts.

Further benefits are experienced by end users or consumers of kit 1000. For example, many users have need for both an IC forklift and an electric forklift depending on different applications of the use, but do not have enough need to justify buying two separate forklifts. Kit 1000 allows for these customers to purchase a kit that will allow them to easily go back and forth between IC forklift 100*a* and electric forklift 100*b* at a cost that is much less expensive than buying two separate forklifts.

Methods of Assembling a Forklift Kit

FIG. 13 is a flowchart illustrating a method 800 of assembly forklifts 100*a* and 100*b* using kit 1000. Method 802 can begin at block 800 by providing kit 1000 for assembling forklifts 100*a*, 100*b* to a user. Method 800 can continue at block 804 by the user deciding whether to assemble IC forklift 100*a* or electric forklift 100*b*.

In response to the user deciding to assemble electric forklift 100*b*, method 800 can continue to block 806 where the user thus chooses electric powertrain 190 for assembly with shell 1010. Method 800 can continue at block 808 by mounting the electric powertrain 190 to chassis 105. Specifically, battery assembly 200 can be mounted within compartment 104, as previously described in detail. In some embodiments, axel 196 can be mounted to chassis 105. However, in other embodiments, shell 1010 includes an axel and differential and electric motor 192 can be mounted directly to the differential and axel of shell 1010. Method 800 can continue at block 810 by hydraulically coupling pump 199 to hydraulic system 150 of shell 1010. Specifically, pump supply port 180 is coupled to system supply port 152 and pump return port 182 is coupled to system return port 154 so that pump 199 can hydraulically charge system 150. Method 800 can optionally continue at block 812 by coupling wheels 109 of kit 1010 to wheel hubs 198 of powertrain 190.

In response to the user deciding to assemble IC forklift 100*a*, method 800 can continue from block 804 to block 814 where the user thus chooses IC powertrain 112 for assembly with shell 1010. Method 800 can continue at block 816 by mounting the IC powertrain 112 to chassis 105. Specifically, engine 114 can be mounted within compartment 104. In some embodiments, engine 114 is mounted to the same mounting bars and brackets of chassis 105 that are used for mounting battery assembly 200. In some embodiments, axel 118 can be mounted to chassis 105. However, in other embodiments, shell 1010 includes an axel and differential and transmission 116 can be mounted directly to the differential and axel of shell 1010. In these embodiments, the axel and differential of shell 1010 is configured to be interchangeably coupled with either transmission 116 or electric motor 192. Method 800 can continue at block 818 by hydraulically coupling pump 122 to hydraulic system 150 of shell 1010. Specifically, pump supply port 123 is coupled to system supply port 152 and pump return port 124 is coupled to system return port 154 so that pump 122 can hydraulically charge system 150. Method 800 can optionally continue at block 820 by coupling wheels 109 of kit 1010 to wheel hubs 120 of powertrain 112.

Although FIG. 13 illustrates blocks 802-820 occurring in a certain order, one with skill in the art will understand that blocks 802-820 can be followed pursuant to any of a number of different orders and that new steps can be added or certain steps can be removed without departing from the scope of this disclosure.

Other Alternatives

Although the present disclosure has been described in terms of the foregoing embodiments, this description has been provided by way of explanation only and is not intended to be construed as a limitation of the invention. For instance, despite reference to Class IV forklifts as such, it should be understood that some aspects of the invention may have broader application with other types of industrial fork trucks, and even other types of vehicles altogether. Indeed, even though the foregoing descriptions refer to numerous components and other embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention.

Accordingly, in all respects, it should be understood that the drawings and detailed descriptions herein are to be regarded in an illustrative rather than a restrictive manner and are not intended to limit the invention to the particular forms and examples disclosed. In any case, all substantially equivalent systems, articles, and methods should be considered within the scope of the invention and, absent express indication otherwise, all structural or functional equivalents are anticipated to remain within the spirit and scope of the presently disclosed systems and methods.

What is claimed is:

1. A kit for assembling a forklift capable of being either electrically- powered or powered by an internal-combustion source, the kit comprising:
- a forklift shell including:
- a chassis including a mounting structure configured to be coupled with one of a plurality of power source, and
- a hydraulics system for operating various components of the forklift;
- an internal-combustion (IC) powertrain configured to be coupled with the chassis and including:
  - an IC engine,
- a transmission operatively coupled to the IC engine,
  - an IC powertrain axel and IC powertrain wheel hubs operatively coupled with the transmission, and
  - an IC hydraulics pump powered by the IC engine and configured to be coupled with the hydraulic system for hydraulically charging the hydraulics system; and
- an electric powertrain configured to be coupled with the chassis and including:
  - a battery assembly configured to be a power source for the forklift,
  - an electric motor operatively coupled to and powered by the battery assembly,
  - an electric powertrain axel and electric powertrain wheel hubs operatively coupled with the electric motor, and
  - an electric hydraulics pump powered by the battery assembly and configured to be coupled with the hydraulics system for hydraulically charging the hydraulics system,
  - wherein the battery assembly comprises:
    - a plurality of battery modules operatively connected to provide an electric potential for powering the electric motor and the electric hydraulic pump, and
    - a battery management system configured to monitor voltage, temperature, and state of charge of the plurality of battery modules;
- wherein, at any one time, one of the IC powertrain and the electric powertrain is configured to be coupled with the chassis and the hydraulics system for powering operation of the forklift.

2. The kit of claim 1, wherein the battery assembly further comprises:
- a traction motor controller for controlling operation of the electric motor; and
- a pump motor controller for controlling operation of the electric hydraulics pump.

3. The kit of claim 2, wherein the battery assembly further comprises:
- housing covers configured to house the plurality of battery modules, the traction motor controller, the pump motor controller, a charging port, and a high current bus assembly; and
- a fan disposed within a rear housing cover and configured to cool the plurality of battery modules.

4. The kit of claim 1, wherein the IC powertrain axel and the electric powertrain axel each comprise a common differential wherein the common differential is configured to be coupled to either of the transmission and the electric motor.

5. The kit of claim 1, wherein the electric powertrain further comprises:
- a bottom mounting plate disposed on a bottom side of battery assembly configured to be mounted to the chassis via press fitting, fastening, welding, or adhering;
- a rear mounting plate disposed at a rear side of the battery assembly configured to be coupled to the chassis via press fitting, fastening, welding, or adhering; and mounting brackets disposed on a front side of the battery assembly and configured to be mounted to bracket receptacles of the chassis via press fitting, fastening, welding, or adhering.

6. The kit of claim 2, wherein:
- the electric hydraulics pump includes a variable speed motor for powering the pump; and
- the pump motor controller is configured to detect operating conditions of the hydraulics system and adjust output of the electric hydraulics pump powered by the variable speed motor based on the detections made.

7. The kit of claim 1, wherein the electric motor is a variable speed motor.

8. The kit of claim 1, wherein the hydraulics system is operatively coupled with a power steering system and a lift assembly of the forklift shell, and further comprises:
- a hydraulic supply port configured to be coupled with a supply port of either of the IC hydraulics pump and the electric hydraulics pump; and
- a hydraulics return port configured to be coupled with a return port of either of the IC hydraulics pump and the electric hydraulics pump.

9. A method for assembling components of a kit to create either an electrically-powered forklift or a forklift powered by an internal-combustion source, comprising:
- providing a forklift kit, wherein the forklift kit includes:
  - a forklift shell including:
    - a chassis including a mounting structure configured to be coupled with one of a plurality of power source, and
    - a hydraulics system for operating various components of the forklift, an internal-combustion (IC) powertrain including:

an IC engine;

a transmission operatively coupled to the IC engine, an IC powertrain axel and IC powertrain wheel hubs operatively coupled with the transmission, and an IC hydraulics pump powered by the IC engine and configured to be coupled with the hydraulic system for hydraulically charging the hydraulics system, and an electric powertrain including:

a battery assembly configured to be a power source for the forklift, an electric motor operatively coupled to and powered by the battery assembly, an electric powertrain axel and electric powertrain wheel hubs operatively coupled with the electric motor, and an electric hydraulics pump powered by the battery assembly and configured to be coupled with the hydraulics system for hydraulically charging the hydraulics system, wherein the battery assembly comprises:

a plurality of battery modules operatively connected to provide an electric potential for powering the electric motor and the electric hydraulic pump, and

10 a battery management system configured to monitor voltage, temperature, and state of charge of the plurality of battery modules;

deciding whether to use the forklift kit to assemble an IC forklift or an electric forklift;

in response to deciding to assemble the IC forklift, operatively coupling the IC powertrain with the chassis and the IC hydraulics pump with the hydraulics system; and in response to deciding to assemble the electric forklift, operatively coupling the electric powertrain with the chassis and the electric hydraulics pump with the hydraulics system.

10. The method of claim 9, further comprising:

in response to deciding to assemble the IC forklift, operatively coupling wheels of the forklift kit to said IC powertrain wheel hubs; and in response to deciding to assemble the electric forklift, operatively coupling said wheels of the forklift kit to said electric powertrain wheel hubs.

11. The method of claim 9, wherein the operative coupling of the IC powertrain with the chassis and hydraulics system comprises:

mounting the IC powertrain to the chassis;

coupling a supply port of the IC hydraulics pump with a supply port of the hydraulics system; and coupling a return port of the IC hydraulics pump with a return port of the hydraulics system.

12. The method of claim 9, wherein the operative coupling of the electric powertrain with the chassis and hydraulics system comprises:

mounting the electric powertrain to the chassis;

coupling a supply port of the electric hydraulics pump with a supply port of the hydraulics system; and coupling a return port of the electric hydraulics pump with a return port of the hydraulics system.

13. The method of claim 9, wherein the battery assembly further comprises:

a traction motor controller for controlling operation of the electric motor; and a pump motor controller for controlling operation of the electric hydraulics pump.

14. The method of claim 13, wherein the battery assembly further comprises:

housing covers configured to house the plurality battery modules, the traction motor controller, the pump motor controller, a charging port, and a high current bus assembly; and a fan disposed within a rear housing cover and configured to cool the plurality battery modules.

15. The method of claim 9, wherein the hydraulics system is operatively coupled with a power steering system and a lift assembly of the forklift shell, and further comprises:

a hydraulic supply port configured to be coupled with a supply port of either the IC hydraulics pump and the electric hydraulics pump; and a hydraulics return port configured to be coupled with a return port of either the IC hydraulics pump and the electric hydraulics pump.

16. The kit of claim 1, wherein each battery module of the plurality of battery modules comprises a plurality of lithium-ion battery cells.

17. The method of claim 9, wherein each battery module of the plurality of battery modules comprises a plurality of lithium-ion battery cells.

18. The method of claim 9, wherein the IC powertrain axel and the electric powertrain axel each comprise a common differential, wherein the common differential is configured to be coupled to either of the transmission and the electric motor.

19. The method of claim 9, wherein the electric powertrain further includes:

a bottom mounting plate disposed on a bottom side of battery assembly configured to be mounted to the chassis via press fitting, fastening, welding, or adhering;

a rear mounting plate disposed at a rear side of the battery assembly configured to be coupled to the chassis via press fitting, fastening, welding, or adhering; and mounting brackets disposed on a front side of the battery assembly and configured to be mounted to bracket receptacles of the chassis via press fitting, fastening, welding, or adhering.

20. The method of claim 13, wherein:

the electric hydraulics pump includes a variable speed motor for powering the pump; and the pump motor controller is configured to detect operating conditions of the hydraulics system and adjust output of the electric hydraulics pump powered by the variable speed motor based on the detections made.

* * * * *